United States Patent
Vo et al.

(10) Patent No.: US 6,795,444 B1
(45) Date of Patent: Sep. 21, 2004

(54) SYSTEM AND METHOD FOR PROVIDING WIRELESS TELEPHONY OVER A PACKET-SWITCHED NETWORK

(75) Inventors: Kim Phuc Vo, Montreal (CA); George Foti, Dollard des Ormeaux (CA); Hung Tran, Montreal (CA); Jean-Francois Bertrand, Montreal (CA); Bartosz Balazinski, Montreal (CA); Francis Lupien, Montreal (CA); Zeng-Jun Xiang, Montreal (CA); Yang Lu, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 09/427,508

(22) Filed: Oct. 26, 1999

(51) Int. Cl.$^7$ ............................................... H04L 12/28
(52) U.S. Cl. ........................................ 370/401; 370/466
(58) Field of Search ................................ 370/401, 352, 370/353, 356, 229, 355, 465, 230, 331, 252, 259, 270, 285, 402, 494, 392, 389, 411, 437, 466; 455/432.2, 436

(56) References Cited

U.S. PATENT DOCUMENTS

| | | | | |
|---|---|---|---|---|
| 5,771,275 | A | | 6/1998 | Brunner et al. ............... 379/67 |
| 5,943,399 | A | * | 8/1999 | Bannister et al. ........ 379/88.17 |
| 6,295,457 | B1 | * | 9/2001 | Narayanaswamy .......... 455/466 |
| 6,314,284 | B1 | * | 11/2001 | Patel et al. .................. 455/417 |
| 6,349,224 | B1 | * | 2/2002 | Lim ........................... 455/575 |
| 6,404,754 | B1 | * | 6/2002 | Lim ........................... 370/338 |
| 6,483,600 | B1 | * | 11/2002 | Schuster et al. ........... 358/1.15 |
| 6,539,237 | B1 | * | 3/2003 | Sayers et al. ............... 455/555 |

FOREIGN PATENT DOCUMENTS

| | | |
|---|---|---|
| EP | 1065870 A2 | 1/2001 |
| WO | WO 97/27717 | 7/1997 |
| WO | WO 97/29605 | 8/1997 |

(List continued on next page.)

OTHER PUBLICATIONS

Ravi Jain, et al., "Mobile Internet Access and QoS Guarantees Using Mobile IP and RSVP with Location Registers", IEEE International Conference on Communications 1998, Jun. 7–11, 1998, pp. 1690–1695.

(List continued on next page.)

*Primary Examiner*—Chi Pham
*Assistant Examiner*—Alexander O. Boakye
(74) *Attorney, Agent, or Firm*—Smith & Danamraj, P.C.

(57) ABSTRACT

A system and method of providing an integrated wireless telecommunications network including a cellular network portion and a packet-switched network portion. The cellular network portion provides legacy mobile telecommunications functionality to mobile subscribers. The packet-switched network portion is provided for transporting communication traffic, wherein the communication traffic comprises traffic originated from a mobile subscriber, traffic intended for a mobile subscriber, or both. The network also includes a gateway disposed between the cellular network portion and the packet-switched network portion for providing a communication path therebetween. An interworking interface module is provided between the cellular network portion and the packet-switched network portion. The interworking interface module preferably comprises a mobility gateway and an IP client (or proxy), wherein the mobility gateway handles mobility management information and the translation of control signaling information between the cellular network portion and the packet-switched network portion. The IP client handles communication traffic with one or more associated servers disposed in the PSN with respect to, e.g., mobility management, security/authentication, and subscriber services of the mobile subscriber.

16 Claims, 23 Drawing Sheets

FOREIGN PATENT DOCUMENTS

| | | |
|---|---|---|
| WO | WO 9737466 | 10/1997 |
| WO | WO 97/39595 | 10/1997 |
| WO | WO 98/03028 | 1/1998 |
| WO | WO 98/38817 | 9/1998 |
| WO | WO 00/69156 | 11/2000 |
| WO | WO 00/79814 | 12/2000 |
| WO | WO 00/79825 | 12/2000 |

OTHER PUBLICATIONS

Kaveh Pahlavan et al., "Handoff in Hybrid Mobile Data Networks", IEEE Personal Communications, Apr. 2000, pp. 34–46.

M. Ylianttila et al., "Handoff Procedure for Heterogeneous Wireless Networks", IEEE Global Telecommunications Conference—Globecom '99, Dec. 5–9, 1999, pp. 2783–2787.

* cited by examiner

SYSTEM AND METHOD FOR PROVIDING WIRELESS TELEPHONY OVER A PACKET-SWITCHED NETWORK

CROSS-REFERENCE TO RELATED APPLICATIONS

This application discloses subject matter related to the subject matter disclosed in the following co-assigned patent applications: (1) "System and Method for Providing Mobile Switching and Multi-Party Services over a Packet-Switched Network," filed Oct. 26, 1999, Ser. No. 09/426,513, in the names of: Hung Tran, Bartosz Balazinski, Jean-Francois Bertrand, and Laura Hernandez; (2) "System and Method for Mobile Terminal Registration in an Integrated Wireless Packet-Switched Network," filed Oct. 26, 1999, Ser. No. 09/427,471, in the names of: Hung Tran, Laura Hernandez, Jean-Francois Bertrand, and Bartosz Balazinski.

BACKGROUND OF THE INVENTION

1. Technical Field of the Invention

The present invention relates to telecommunication systems and, more particularly, to systems and methods for providing wireless telephony over a packet-switched network such as, for example, a network using the Internet Protocol (IP).

2. Description of Related Art

Coupled with the phenomenal growth in popularity of the Internet, there has been a tremendous interest in using packet-switched network (PSN) infrastructures (e.g., those based on IP addressing) as a replacement for the existing circuit-switched network (CSN) infrastructures used in today's telephony. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

The existing Voice-over-IP (VoIP) networks implement communications infrastructures that are typically based on multiple protocols which include, for example, the well-known H.323 protocol. These protocols are primarily oriented to operating with fixed-network-based telecommunications protocols and are designed to provide such services as call control, et cetera, for wireline subscribers only. Current VoIP systems, accordingly, cannot be used advantageously in wireless environments, although some VoIP systems may support rudimentary location management services.

There also exist several inadequacies in the Plain Old Cellular System (POCS) with respect to supporting IP-based infrastructures and services. Also, there exist deficiencies and shortcomings in the existing IP-based VoIP systems in terms of supporting wireless access technology such as for example, ANSI-136, Global System for Mobile communications (GSM), IS-95, et cetera. Some of the more significant of these inadequacies and shortcomings are summarized below.

First, current POCS systems and technology infrastructures are not compatible with communications infrastructures as required by the VoIP standards. The operation, maintenance, and the connection management required by the traditional POCS systems are based on switched physical trunk connections. These mechanisms are not compatible with the packet switching/routing mechanisms such as, e.g., Domain Name System (DNS), Dynamic Host Configuration Protocol (DHCP), etc. required for managing device/host addressing and configuration.

Incompatibilities also exist between POCS protocols and communications protocols of the existing VoIP applications. The POCS systems cannot support a Plain Old Telephone System (POTS) or Integrated Services Digital Network (ISDN) client in the Internet context. The Internet "client" is typically required to handle Internet-based protocols such as, e.g., Real-time Transfer Protocol (RTP), Resource Reservation Protocol (RSVP), etc. which are not in the definition or domain of the POCS systems.

Another important disparity which should be noted is that the POCS signaling and user data planes use distinct physical transport and network facilities. The IP-based networks are flexible in that they can support any higher layer protocols, and information can be transmitted over any lower layer e.g., a link or physical layer. Moreover, the higher layer protocols may be used for signaling as well as user data.

With respect to the inadequacies of the existing VoIP systems, it should be appreciated that current VoIP clients and infrastructure can handle neither the wireless access-side technology nor the basic network-side functional signaling plane which enables mobility management, authentication/security, service definition, service mitigation and execution, et cetera. Clearly, the provision of such advancements in the POCS as Wireless Intelligent Network (WIN) services, can only magnify these and other disparities and incompatibilities between the POCS and VoIP infrastructures.

Based on the foregoing, it is apparent that in order to address these and other problems of the current technologies set forth above, what is needed is a seamless integration between the existing POCS and VoIP infrastructures so that the numerous advantages, known and hitherto unknown, of packet-based networks may be realized within the context of wireless telecommunications. The present invention provides such a solution.

SUMMARY OF THE INVENTION

In exemplary embodiment, the present invention advantageously integrates the existing VoIP packet switching infrastructures with the POCS by selectively replacing structural and functional elements that allow the existing VoIP and POCS systems to co-exist and evolve independently. In other words, legacy infrastructures in each realm are left intact to the extent possible in order to provide backward compatibility. Accordingly, in the presently preferred exemplary embodiment of the present invention, available VoIP functions are substituted for corresponding ANSI-136/41 functions, while the remaining ANSI-136 functions preferably continue to exist in their legacy form. To minimize infrastructure modifications, a mechanism is introduced for interfacing the "footprint" of a VoIP system with the POCS legacy structures with respect to call control, mobility management, subscriber services, et cetera.

Accordingly, a presently preferred exemplary embodiment is directed to an integrated network system comprising a packet-switched network portion and a cellular telecommunications network portion, with an interworking function module (or proxy device) disposed therebetween for interfacing between the legacy POCS and VoIP PSN infrastructures. The proxy device is preferably comprised of a "VoIP proxy" or "IP client" and a mobility gateway (MGW or Mob.GW). The MGW preferably handles signaling information between the POCS CSN and PSN infrastructures.

The proxy/IP client, on the other hand, handles IP traffic (signaling and user data, which includes voice or other information) therebetween for mobility management, security and subscriber services, respectively. Accordingly, the proxy makes, or provides, the link between, on the one hand, the POCS legacy mobility, security, subscriber services and supplementary WIN services, and on the other hand, the VoIP PSN-specific legacy mobility management, security and services, regardless of whether these are interfaced from the IP client, or the server disposed in the VoIP infrastructure.

The MGW's role is preferably to "gate" the transfer of control signaling information relating to the aforementioned functions. In accordance with the teachings herein, the functionality of a presently preferred exemplary embodiment of the Mob. GW (or MGW) is summarized below.

A Mob. GW implements the mobility management entity that maintains the MS-associated VoIP infrastructures' location information. The Mob. GW handles the ANSI-41 automatic roaming signaling interface for location management towards the ANSI-41 (a subset of the D interface). In this sense, it is seen as a Visitor Location Register (VLR) by the ANSI-41 PLMN. It also implements the PSN-specific location management signaling interface to and from the PSN infrastructure (e.g., RAS, SIP signaling etc.). Hence, the Mob. GW is also a protocol converter between the ANSI-41 and H.323/SIP signaling.

The Mob. GW also handles the call routing interface between the ANSI-41 PLMN and PSN VoIP networks. This mechanism enables (i) the routing of a call and/or service from the PSN towards the associated ANSI-41 PLMN portion; and (ii) the routing of a call and/or service from the ANSI-41 PLMN portion towards the served PSN VoIP system. Thus, the Mob. GW handles the part of the ANSI-41 automatic roaming signaling interface for call delivery (e.g., location requests, route requests, etc.) towards the ANSI-41 PLMN. On the PSN side, the Mob. GW implements the H.323 or SIP call routing interface.

In one exemplary embodiment, the proxy device or its constituents (i.e., Mobility GW, various IP clients, etc.) may be implemented as co-located components within cellular infrastructures. For example, the MGW functionality can be advantageously provided within a VLR. Also, the MGW may be realized as a distinct intermediary entity provided between (i) the IP client functions and the ANSI-41 network, and (ii) the IP server functions and the ANSI-41 network. One of ordinary skill in the art should understand that the MGW may also be provided closer to the POCS infrastructures so as to realize savings in transmission. In either embodiment, the device is responsible for routing the ANSI-41 signaling and H.323/SIP signaling for location management and security purposes (registration from the PSN side), for call routing (ANSI-41 location request and route request messages), and finally for service handling (service triggering, mitigation and execution) purposes.

In one broad aspect, therefore, the preferred embodiment of the present invention advantageously provides an integrated telecommunications network comprising a cellular network portion which provides legacy mobile telecommunications functionality to mobile subscribers and a packet-switched network (PSN) portion for transporting communication traffic. The communication traffic comprises traffic originated from a mobile subscriber, traffic intended for a mobile subscriber, or both. The network also includes a gateway, e.g., media gateway, disposed between the cellular network portion and the packet-switched network portion for providing a communication path therebetween. An interworking interface module is provided between the cellular network portion and the PSN portion. The interworking interface module preferably comprises a mobility gateway and an Internet Protocol (IP) client, wherein the mobility gateway handles mobility management information and the translation of control signaling information between the cellular network portion and the PSN portion. The IP client handles communication traffic with one or more associated servers provided in the PSN portion with respect to, e.g., mobility management, security, and subscriber services of the mobile subscriber.

In an alternative embodiment, the present invention is directed to an integrated wireless VoIP network which includes a cellular portion and an IP portion. The integrated wireless VoIP network comprises a Mobile Switching Center (MSC) serving a mobile terminal located in the MSC's serving area and a gateway (e.g., media gateway) located nearest to the serving MSC. The gateway is included for providing a communication path between the cellular portion and the IP portion. A Visitor Location Register (VLR) is associated with the MSC for maintaining location information with respect to the mobile terminal registered thereat. Preferably, the location information stored at the VLR includes the location of the nearest gateway. A gatekeeper is included in the integrated wireless VoIP network for providing location inquiry messages in response to a call placed by a calling party, wherein the call is intended for the mobile terminal. Further, an interface device is advantageously disposed between the VLR and the gatekeeper. When the location inquiry messages are sent out by the gatekeeper, the interface device translates the messages received thereat into messages compatible with the VLR so that the gateway location information with respect the registered mobile terminal is returned to the gatekeeper for call routing. In alternative embodiment, the interface device may be directly coupled to the IP portion via a connection path for transporting the location inquiry messages.

In a further aspect of the alternative integrated network embodiment, the present invention provides a method of routing a calling party's call to a mobile terminal in an integrated wireless packet-switched network which includes a cellular network portion and a packet-switched network portion. The cellular network portion comprises a VLR having an interface operable with the packet-switched network portion. An MSC is provided for serving the mobile terminal when located in the MSC's serving area. The packet-switched network portion is coupled to a gatekeeper and a gateway that is located closest to the MSC. The call routing method begins when the call intended for the mobile terminal is received in the packet-switched network portion. Responsive to the call, a request message is sent from the packet-switched network portion to the gatekeeper for locating the mobile terminal. In response, the gatekeeper sends a location request to the VLR interface for determining the address of the gateway that is located closest to the MSC. If the mobile terminal is registered at the VLR, a location confirm return message is sent therefrom to the gatekeeper. The return message includes the address of the gateway that is nearest to the MSC. Thereafter, the call is routed to the gateway based on the received address.

In a further aspect of an alternative embodiment, the present invention is directed to a method of routing a calling party's call to a mobile terminal in an integrated wireless packet-switched network system which includes a cellular network portion and a packet-switched network portion. The cellular network portion preferably comprises a Home Location Register (HLR) having an interface operable with the packet-switched network portion and an MSC visited by the mobile terminal. The packet-switched network portion preferably comprises a gatekeeper and a gateway, wherein the gateway is located closest to the VMSC. The method begins by receiving the call in the packet-switched network portion, wherein the call is intended for the mobile terminal served by the VMSC. Responsive to the call, an admission request message is sent to the gatekeeper for locating the mobile terminal. Responsive to the admission request message, a location request is issued to the HLR interface for determining the address of the gateway that is located closest to the VMSC. A location confirm return message is sent from the HLR interface, with the gateway's address included therein. Thereafter, an admission confirm return message is sent from the gatekeeper to the calling party. Subsequently, the incoming call is routed to the gateway based on the received address from the gatekeeper.

The present invention, in a further aspect, is directed to several presently preferred exemplary embodiments of a call handoff method usable in the alternative network embodiment. In a first embodiment, an inter-MSC call handoff method is provided for handing over a call between a mobile terminal and a party in an integrated wireless packet-switched network system. First, second and third gateways, and one or more gatekeepers associated therewith are disposed within the integrated wireless packet-switched network system, wherein the first gateway is coupled to a first MSC, the second gateway is coupled to a second MSC, and the third gateway is associated with the party. The initial call path involves the first MSC, and the first and third gateways over the packet-switched network portion. The call handoff method commences by sending a handoff measurement request from the first MSC to the second MSC. The first MSC then receives a handoff measurement response message from the second MSC. Responsive thereto, a facility directive message is sent from the first MSC to the second MSC. The first MSC then notifies the third gateway to set up a connection between the second and third gateways over the packet-switched network portion. Accordingly, the connection between the second and third gateways is set up over the packet-switched network portion. Thereafter, a handoff order is sent from the first MSC to the mobile terminal, and the initial call path is released once the mobile terminal is received by the second MSC on a designated channel.

In a second embodiment, an inter-IP handoff method is provided for handing over a call between a mobile terminal and a party in an integrated wireless packet-switched network system. First and second gateways, and a serving gatekeeper associated therewith are disposed in the integrated wireless packet-switched network system, wherein the first gateway is coupled to an MSC and the second gateway is associated with the party. A software-defined radio base station (SDR BS), having direct IP-connectivity and controlled by a Mobile Switching Application (MSA), is directly connected to the packet-switched network portion. The initial call path involves the MSC and the first and second gateways over the packet-switched network portion. The call handoff method begins by sending a handoff measurement request from the MSC to the MSA. The MSC then receives a handoff measurement response message from the MSA. A facility directive message is then sent from the MSC to the MSA. Responsive thereto, a facility directive response message is sent from the MSA to the MSC. Subsequently, a handoff indication and an address of the software-defined radio base station are sent to the serving gatekeeper from the MSC. In response, a logical channel is established between the first gateway and the software-defined radio base station. The MSC is notified thereafter to issue a handoff order to the mobile terminal. The initial call path is released once the mobile terminal is received by the software-defined radio base station on a designated channel.

In a third exemplary embodiment, another inter-MSC call handoff method is provided for handing over a call between a mobile terminal and a party in an integrated wireless packet-switched network system using an intermediate call path which includes an inter-MSC trunk path between a first MSC and a second MSC for a selected period of time. The integrated wireless packet-switched network system includes first, second and third gateways, and one or more gatekeepers associated therewith, wherein the first gateway is coupled to the first MSC, the second gateway is coupled to the second MSC, and the third gateway is associated with the party. The initial call path involves the first MSC, and the first and third gateways over the packet-switched network portion. The call handoff method begins by sending a handoff measurement request from the first MSC to the second MSC. A handoff measurement response message from the second MSC is received in the first MSC. Responsive to the handoff measurement response message from the second MSC, a handoff message is sent from the first MSC to the second MSC. Subsequently, an intermediate call path is established between the mobile terminal and the party, the intermediate call path involving a trunk segment between the first and second MSCs. A call connection between the second and third gateways over the packet-switched network portion is then negotiated. Upon completing the connection between the second and third gateways, the trunk segment between the first and second MSCs is released.

In a still further aspect, the present invention is directed to several embodiments of call routing systems and methods in an integrated wireless packet-switched network system. In one embodiment, a call routing system is provided which includes a Gateway Mobile Switching Center (GMSC) and a visited Mobile Switching Center (VMSC), each of which is equipped with a gateway interfaced with a packet-switched network portion disposed therebetween. Also included are an HLR coupled to the GMSC and VMSC, and a gatekeeper coupled to the gateway associated with the GMSC. The VMSC includes means for determining whether the call is to be routed through the packet-switched network portion, in addition to means for returning a non-routable number. When an incoming call intended for the mobile terminal is received in the GMSC, a non-routable number is forwarded thereto by the VMSC. The non-routable number is translated in the gatekeeper to obtain an address for the gateway associated with the VMSC, the address being operable with the packet-switched network portion. The gateway address is then used for routing the incoming call over the packet-switched network portion.

In another embodiment, a call routing method is provided for routing an incoming call to a mobile terminal served by a VMSC in an integrated wireless packet-switched network system. A packet-switched network portion is disposed between a GMSC and the VMSC, each of which is provided with a gateway for the packet-switched network portion which includes a gatekeeper. The method begins by receiving the incoming call in the GMSC, and in response, sending a location request from the GMSC to an HLR associated with the mobile terminal. A routing request message is then sent from the HLR to the VMSC which assigns a non-routable number to the route request message based on the mobile terminal's location. Thereafter, a routing request return result message is sent from the VMSC to the HLR, the routing request return result message including the non-routable number. A location request return result message, including the non-routable number, is sent from the HLR to the GMSC. A setup request is forwarded by the GMSC to the gatekeeper which translates the non-routable number to obtain an address for the gateway associated with the VMSC. The incoming call is then routed from the gateway associated with the GMSC to the VMSC over the packet-switched network portion using the address for the gateway associated with the VMSC.

In a still further embodiment, the present invention provides a method of routing an incoming call to a roaming mobile subscriber in an integrated wireless packet-switched network system which includes a packet-switched network portion disposed between a GMSC and a VMSC. Each of the GMSC and VMSC is provided with a gateway for the packet-switched network portion. The method begins by detecting, in the VMSC, that the mobile subscriber is roaming in a serving area associated with the VMSC. Then, a registration message is sent from the VMSC to an HLR of the mobile subscriber. Responsive to the registration message, the HLR returns a subscriber profile associated with the mobile subscriber, the subscriber profile including a parametric indication of whether the incoming call is to be delivered to the mobile subscriber over the packet-switched network portion. When the GMSC receives the incoming call intended for the mobile subscriber, it sends a location request to the HLR. In turn, a routing request message is sent from the HLR to the VMSC. The VMSC returns to the HLR an address assigned to the gateway interfacing with the packet-switched network portion, wherein the gateway is associated with the mobile subscriber. Subsequently, the HLR determines whether the parametric indication indicates that the incoming call is to be delivered to the mobile subscriber over the packet-switched network portion. If so, the address of the gateway associated with the mobile subscriber is provided to the GMSC. The incoming call is then routed from the GMSC to the mobile subscriber over the packet-switched network portion, using the address of the gateway.

In yet another embodiment, a method is provided for routing an incoming call to a mobile subscriber in an integrated wireless packet-switched network system by indicating that a GMSC is capable of routing the call over a packet-switched network portion disposed between the GMSC and a VMSC. Each of the GMSC and VMSC is provided with a gateway for the packet-switched network portion. The method commences by receiving, in the GMSC, the incoming call intended for the mobile subscriber located in a serving area associated with the VMSC. Responsive thereto, a location request is sent from the GMSC to the HLR, the location request including a parametric indication that the GMSC is capable of routing the incoming call over the packet-switched network portion. A routing request message from the HLR to the VMSC also includes the GMSC's parametric indication. The VMSC then determines if it is capable of communicating with the GMSC over the packet-switched network portion. If so, an address of the gateway associated with the VMSC is provided to the GMSC. Thereafter, the incoming call is routed from the GMSC over the packet-switched network portion to the mobile subscriber, using the VMSC's gateway address.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EMBODIMENTS

As set forth above, the present invention is broadly directed to providing an integrated network system which combines the existing POCS network infrastructures with a packet switched network for the purpose of transmitting cellular communications/data using, at least in part, appropriate packet data transmission protocols, e.g., the H.323 or SIP, et cetera. In a presently preferred exemplary embodiment, the integrated telecommunications network system of the present invention is envisaged as a wireless Internet Protocol (WLIP) network system, having a CSN wireless portion and a PSN VoIP portion. Each of these portions may be realized in an appropriate standard or protocol. Further, the present invention is also directed to providing innovative solutions relating to the various aspects of cellular services and control such as, for example, call management, mobility control and roaming, call handoff, et cetera, within the context of such a WLIP network realized preferably in the H.323 protocol. One of ordinary skill in the art should realize upon reference hereto that whereas these various solutions are presently preferably described without the use of the proxy device in some exemplary embodiments, they can also be implemented using the proxy device or the MGW provided in accordance herewith in alternative embodiments. Moreover, reference to an MSC in the present patent application, both hereinbelow and hereinabove, in some implementations, implies a reference to a co-located MSC-VLR entity in the POCS infrastructure sense; unless otherwise a contextual reference is deemed more appropriate. In addition, an MSC may mean, in some implementations, an MSC operable as a gateway MSC also; unless otherwise a contextual reference is deemed more appropriate.

Accordingly, for the twin purposes of better organization and clearer elucidation, the Detailed Description of the present patent application is arranged into appropriate subsections, starting with an explanation of a presently preferred architectural scheme of a horizontally integrated WLIP network system provided in accordance with the teachings of the present invention, as set forth immediately below.

I. Architectural Overview

Figure 1:
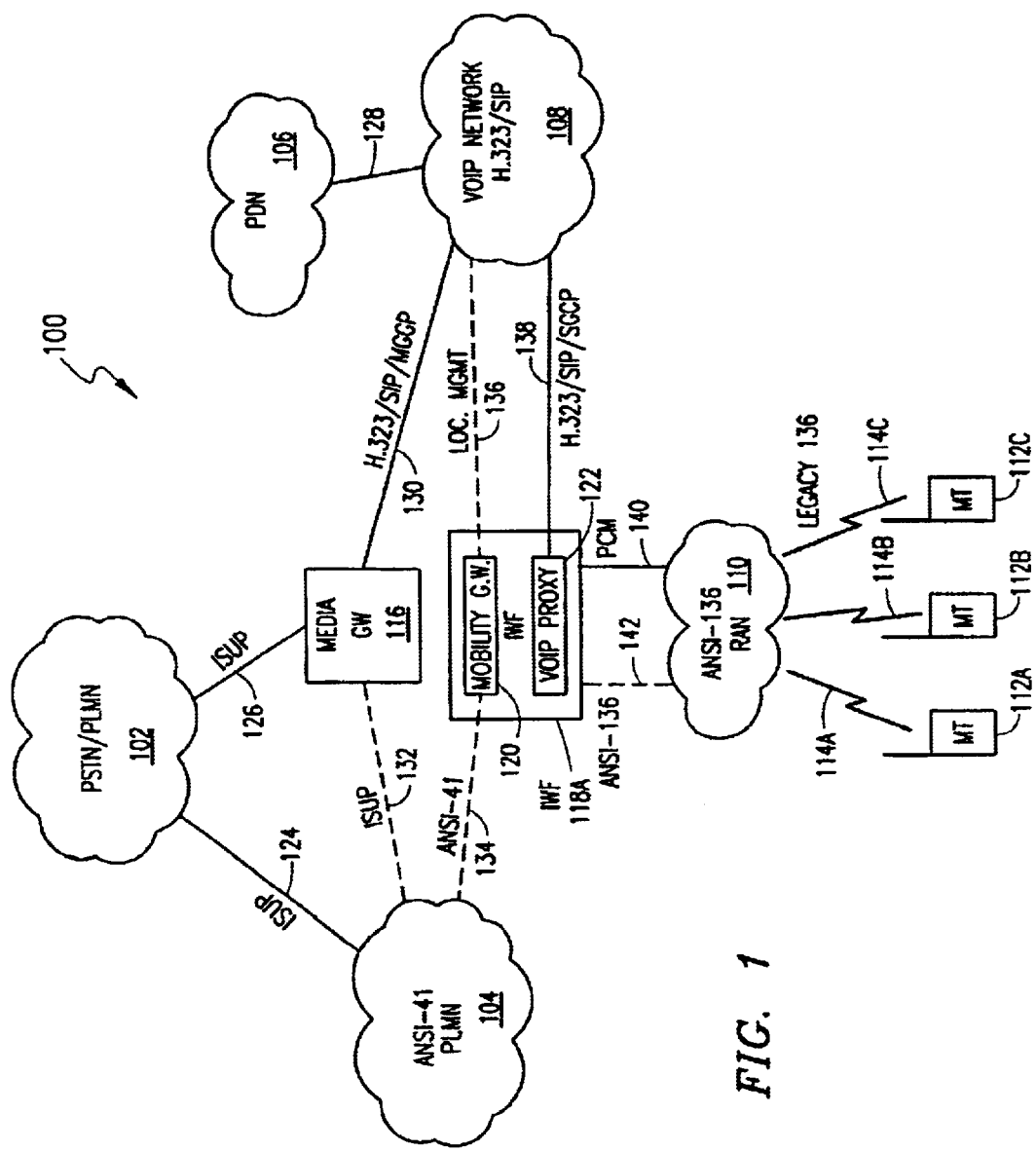
FIG. 1 depicts a functional block diagram of an architectural scheme provided in accordance with the teachings of the present invention for integrating a Plain Old Cellular System (POCS) network with a packet-switched network (PSN) using Internet Protocol (IP) for voice transmission (VoIP network)

Referring now to FIG. 1, depicted therein is a functional block diagram of a presently preferred architectural scheme 100 for providing a WLIP network system in accordance with the teachings of the present invention. The architectural scheme 100 of the WLIP network system provides interoperable functionality among an ANSI-41 Public Land Mobile Network (PLMN) portion 104, a Public Switched Telephone Network (PSTN)/PLMN portion 102, a Voice-over-IP (VoIP) network portion 108 and an ANSI-136 Radio Access Network (RAN) 110, by means of an Interworking Function (IWF) 118A and appropriate media gateways, for example, Media GW 116, disposed between the legacy POCS network portions and the VoIP portion.

The fundamental rationale for providing the WLIP architectural scheme 100 as shown in FIG. 1 stems from the notion that there are several shortcomings and deficiencies in both the existing POCS infrastructures and current Voice-over-IP (VoIP) technologies with respect to merging their respective elements and functionalities, and that a preferred way to accomplish seamless integration thereof with little disruption to either the POCS or VoIP network portions is to establish an interface, such as the IWF 118A, which manages call control, mobility and assorted services in relation to cellular transport over IP.

In order to provide a better understanding of the WLIP architectural scheme 100, the functional sub-architectures of the POCS and VoIP network portions are described hereinbelow. The POCS (based on ANSI-136/41 or other appropriate radio telecommunications standards) signaling plane and associated functions can be defined by the following high level components:

Radio Access Network control, e.g., RAN component 110;

Switching resources with associated management functions and connection control functions;

mobility management, authentication, and security functions call and service processing control; and Wireless Intelligent Network (WIN) service processing functions, if applicable.

The VoIP sub-architectures can be defined by utilizing the following high level components:

a "telephony" call client (typically, the user) for call originating/terminating;

a "telephony" call server (typically, the network, e.g., VoIP network 108) to handle connection control and associated signaling for setting up, and maintaining connections between (a) the PSTN/PLMN portion 102 and VoIP call client; and (b) two VoIP call clients (that is, the call server can handle calls between any VoIP client and another user regardless of user's location);

a location directory and associated location services for maintaining the location of IP devices such as ports, et cetera; and a gateway (e.g., GW 116) interfacing with the call server for connection control and other PSTN and PLMN control signaling, and with the call client for user data transport and exchange.

Continuing to refer to FIG. 1, the functional sub-architectures of the POCS and VoIP network portions are further described in order to highlight the integration philosophy underlying the WLIP architectural scheme 100. In the interest of preserving the integrity of both ANSI-136/41 and VoIP architectural components, what may be deemed as a "horizontal integration" approach is utilized in implementing the WLIP architectural scheme 100. In the horizontal integration model, relationships may be defined between functional components that belong to different network realms (e.g., POCS or VoIP), where they perform similar and/or related tasks. The defined relationships are designed such that they do not impose requirements that necessitate changes in the respective core networks.

Accordingly, in the context of this particular exemplary embodiment of the integrated telecommunications network of the present invention, the horizontal integration approach involves maintaining the ANSI-136/41 signaling plane as independent as possible from the VoIP functional plane. In other words, any overlap between the sets of functions available within the ANSI-136/41 and VoIP architectures, respectively, is kept at a minimum. Further, to the extent necessary for providing the IP infrastructure for cellular transport, a portion of ANSI-41 functions are replaced with corresponding functions realized in the protocol structure (for example, the H.323 standard) used for the VoIP transport. Functions not realized in the VoIP protocols, on the other hand, for example, security and quality of service (QoS), are maintained in their native ANSI-136/41 framework.

To replace or augment the circuit-switched infrastructure of the POCS network portion with the packet-switched VoIP portion, the ANSI-41 network portion is provided with the interfacing IWF module 118A for appropriately mapping the requisite control signaling information needed with respect to call control, mobility, and services. It should be appreciated that the closer the IWF module 118A is implemented to the POCS radio access point, the more optimal is the IP transport utilization. Accordingly, the IWF module 118A, comprising a VoIP proxy/client 122 and an MGW 120, is directly interfaced with the ANSI-136 RAN portion 110 of the integrated architectural scheme 100. As mentioned before, the MGW 120 preferably handles signaling information between the POCS CSN and the PSN infrastructures. The proxy 122 handles the VoIP traffic (signaling+user data (voice or otherwise)) with one or more associated servers provided in the PSN infrastructures. Thus, the VoIP proxy takes on different functionalities depending upon the specific aspect of the communication traffic. Accordingly, for example, it may be provided to be operable as a security client with respect to certain security functionality of the network. A plurality of mobile terminals (or, synonymously, mobile stations (MSs)), for example, MT 112A through MT 112C, are interfaced with the RAN portion 110 via legacy ANSI-136 air interface links, for example, links 114A through 114C, respectively.

In the WLIP architectural scheme 100, signaling paths are denoted by broken lines, whereas user data/voice paths are shown as solid lines. The IWF module 118A is coupled to the RAN portion 110 via an ANSI-136 signaling path 142 and a modulated data/voice path 140 (for example, a Pulse Code Modulated (PCM) path). An ANSI-41 signaling path 134 is disposed between the PLMN portion 104 and the IWF module 118A. The Media GW 116 is coupled to the PLMN portion 104 via an ISDN User Part (ISUP) path 132. Also, ISUP paths 124 and 126 are provided, respectively, between the PLMN portion 104 and the PSTN/PLMN portion 102, and between the PSTN/PLMN portion 102 and the Media GW 116.

Still continuing to refer to FIG. 1, the VoIP network portion 108 may be implemented using any known technologies or standards, or combinations thereof such as, for example, the well-known H.323 protocol by the International Telecommunications Union (ITU), Session Initiation Protocol (SIP) or Internet Protocol Device Control (IPDC) by the Internet Engineering Task Force (IETF), or Simple Gateway Control Protocol (SGCP). Accordingly, multi-protocol-compatible paths 130 and 138 are shown, respectively, between the VoIP network portion 108 and the Media GW 116, and between the VoIP network portion 108 and the VoIP proxy agent 122 of the IWF module 118A. In addition, a control signal path 136 is disposed between the Mobility GW 120 and the VoIP network portion 108 for location management, et cetera, which will be described in greater detail hereinbelow. Also, a conventional user data path may be provided between the VoIP network portion 108 and a Packet Data Network (PDN) 106.

II. Network Model

Figure 2A:
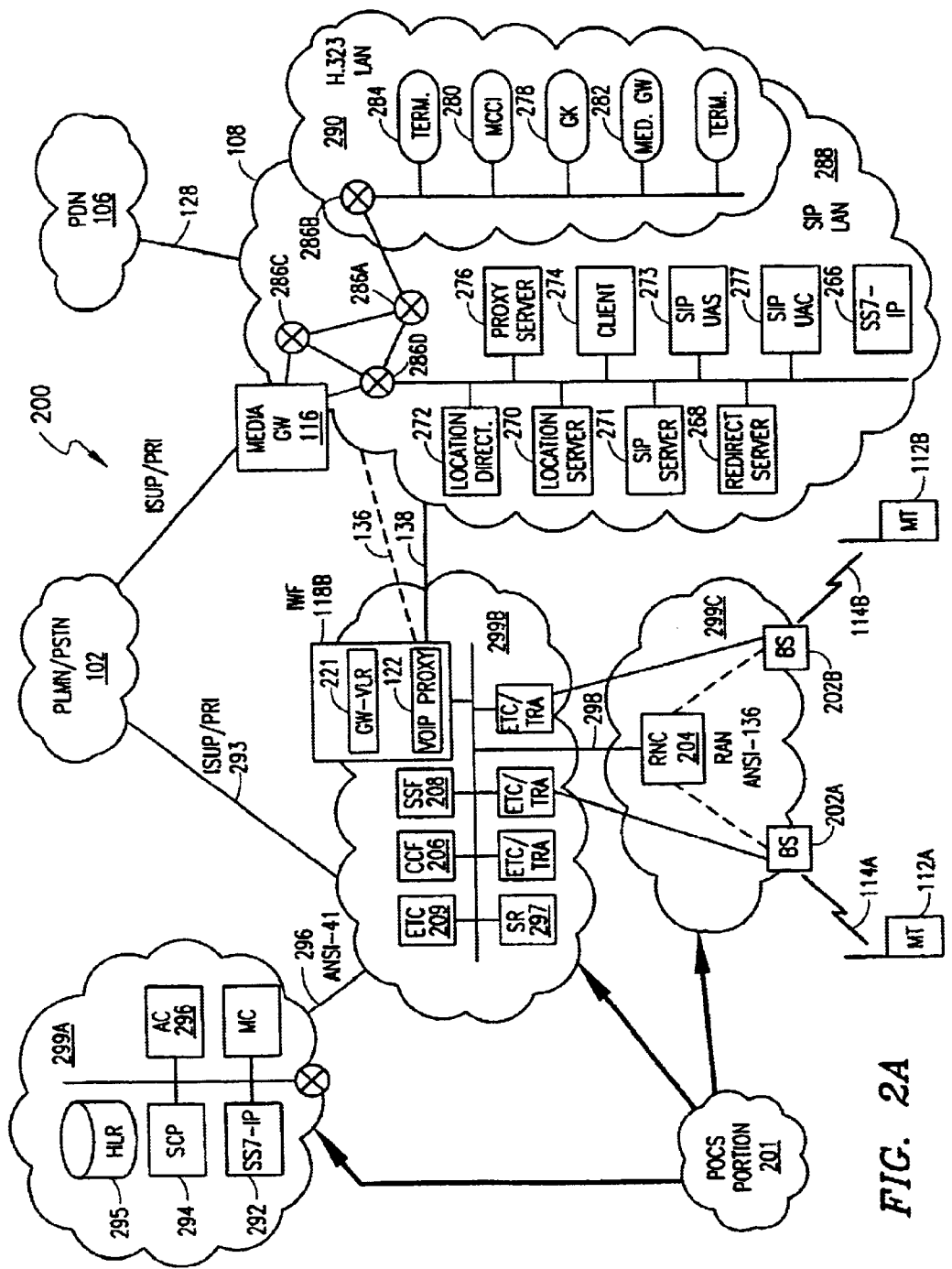
FIG. 2A depicts a functional block diagram of a presently preferred exemplary embodiment of an integrated network (wireless IP or WLIP network) with a POCS network portion and a VoIP network portion.

Referring now to FIG. 2A, depicted therein is a functional block diagram of a presently preferred exemplary embodiment of an integrated telecommunications network or WLIP network 200 provided in accordance with the teachings of the present invention. A POCS network portion 201 is provided as a composite of a plurality of sub-portions, shown herein as a first sub-portion 299A, a second sub-portion 299B and a third sub-portion 299C. It should be apparent that the POCS sub-architectures described hereinabove with respect to the WLIP architectural scheme 100 depicted in FIG. 1, namely, the ANSI-41 PLMN 104, ANSI-136 RAN 110, et cetera, are realized in the three sub-portions of the POCS network portion 201.

The sub-portion 299C, which effectuates the RAN 110, comprises at least one Radio Network Control (RNC) component 204, and one or more base stations (BS) such as, for example, BS 202A and BS 202B. The MT 112A and MT 112B are shown in the conventional ANSI-136 air interface arrangement with the BS 202A and BS 202B, respectively.

The RNC component 204 is coupled via an ANSI-136 signaling path 298 to the POCS sub-portion 299B which comprises a first plurality of cellular components such as, for example, an Exchange Terminal (ETC) 209, a Call Control Function (CCF) component 206, a Subscriber Services Function (SSF) component 208, a Special Resources (SR) component 297, et cetera.

It should be understood that in accordance herewith, in order to effectuate the integration as contemplated in this particular exemplary embodiment of the integrated telecommunications network, a conventional Mobile Switching Center (MSC) of POCS infrastructure is modified to provide only radio services. Accordingly, the switching functionality of the MSC is removed therefrom such that it becomes an RNC (e.g., RNC 204 shown herein) for providing the radio resource control and management functionality, in conjunction with the Base Stations of the sub-network potion 299C.

Preferably, the ANSI-136 signaling path 298 between the RNC component 204 and the POCS sub-portion 299B is effectuated for such purposes as Call Control (CC), Mobility Management (MM), Authentication (AUTH), et cetera. In accordance with the teachings of the present invention, another exemplary embodiment of the IWF interface module (denoted by reference numeral 118B) is also provided as a component within the POCS sub-portion 299B, which is coupled via an ANSI-41 path 296 to the POCS sub-portion 299A. It should be appreciated that in this embodiment, the IWF module 118B includes a combined entity 221 formed from merging the functionality of the Mobility GW and a VLR.

A second plurality of cellular components such as, for example, a Home Location Register (HLR) 295, a Service Control Point (SCP) 294, an Authentication Center (AC) 296, et cetera, form the POCS sub-portion 299A. Preferably, a Signaling System 7 (SS7)-to-IP interface component 292 may also be provided therewith. Additionally, an ISUP path 293 is provided between the POCS network portion 299B and the PSTN/PLMN 102 in a conventional manner.

The VoIP network portion 108 is preferably provided as a plurality of interconnected hubs, bridges or routers, such as, for example, hub/bridge elements 286A through 286D. Using these hub/bridge elements, sub-portions may be effectuated within the VoIP network portion 108, wherein each sub-portion may be realized in, or optimized for, a different VoIP protocol or standard. For example, an H.323 sub-portion 290 and an SIP sub-portion 288 are shown in FIG. 2. A first plurality of IP elements such as, for example, a gatekeeper (GK) 278, an H.323 media gateway 282, a Multipoint Control Unit (MCU) 280, and one or more terminals (e.g., terminal 284), form the H.323 sub-portion 284. Similarly, a second plurality of IP elements forms the SIP sub-portion 288. Preferably, these elements include a SIP Proxy server 276, one or more SIP clients (e.g., SIP client 274), a User Agent Server (UAS) 273, a User Agent Client (UAC) 277, a Location Directory 272, a Location Server 270, a SIP server 271, and a Redirect Server 268. In addition, the SIP sub-portion 288 preferably comprises an SS7-to-IP interface component 266. Furthermore, in accordance with the teachings of the present invention, the Media gateway 116 is also disposed as part of the interface between VoIP network portion 108 and PSTN/PLMN 102.

A detailed functional description of the integrated WLIP network 200 will now be set forth below.

As stated in the foregoing, the ANSI-136/41 signaling plane and functions are kept independent and separate from the VoIP system functional plane. Accordingly, the control of RAN is maintained by and within the POCS infrastructures described above. The mobility management services are integrated in such a manner as to minimize functional interdependency. From the ANSI-41 network infrastructure perspective, the VoIP infrastructure location server/directory (e.g., SIP Location Directory 272 and Location Server 270) is provided hierarchically at a lower level than (that is, slave to) the ANSI-41 GW-VLR 221. The GW-VLR 221 maintains the MS-associated VoIP infrastructures' location information for calls to be delivered from the ANSI-41 network. This feature addresses the POCS need for the location information on which VoIP infrastructure's call server and gateway a call is to be routed. Thus, the combined GW-VLR operates to carry out mobility gateway functions between the ANSI-136/41 infrastructures and the VoIP infrastructures. Furthermore, in alternative embodiments, the "mobility gateway" functions may be external to the POCS serving system's infrastructures.

Based on the foregoing and the remaining portions of the description, the functionality of the Mobility GW of the present invention as set forth in this exemplary embodiment, may be recaptured as follows.

The MGW 120 is preferably provided as part of the integrated telecommunications network for the purpose of implementing a mobility management entity that maintains the MS-associated VoIP infrastructure location information. In accordance with the teachings of the present invention, the MGW is preferably provided as a protocol converter for the specified signaling between the ANSI-41 and PSN VoIP infrastructures. From the MGW's perspective, and from the perspective of the POCS network, the VoIP infrastructure location server/directory is hierarchically at a lower level (that is, the VoIP infrastructure location server/directory is slave to the MGW). In this sense, the MGW is seen as a VLR by the ANSI-41 PLMN.

The MGW handles the ANSI-41 automatic roaming signaling interface for location management towards the ANSI-41 network (i.e., a subset of the D interface). It also implements the PSN-specific location management signaling interface to/from the PSN infrastructure (i.e., RAS, SIP signaling, et cetera).

When seen as an entity having VLR-like functionality, the MGW handles the call routing signaling interface for routing of calls between ANSI-41 PLMN and PSN VoIP networks. Towards the ANSI-41 PLMN, the MGW handles automatic roaming signaling interface for call delivery (that is, location requests, route requests, etc.). On the PSN side, the MGW handles the VoIP call routing interface, e.g., an H.323 or SIP call routing interface. It should be readily appreciated that this mechanism enables the routing of calls and services from the ANSI-41 PLMN towards the served PSN VoIP system.

Optionally, the MGW may implement the ANSI-41 C interface and be utilized as a "mobile routing gateway" by the PSN for calls originating in the PSN and destined for the ANSI-41 PLMN. It should be noted, however, that the PSN-originated calls may also be routed through a regular media gateway (e.g., the media gateway 116), depending on the routing case chosen.

Continuing to refer to FIG. 2A, the POCS infrastructures maintain one or more VoIP mobility clients (part of the VoIP proxy) as may be necessary. The VoIP mobility client interworks with the radio access function's (that is, RAN's) registration signaling. Further, the mobility client updates location information towards the VoIP infrastructure's location server, e.g., Location Server 270. For location updates to the POCS VLR, either the VoIP mobility client or the Location Server 270 may interface with the POCS VLR functions directly, or via the MGW.

From the perspective of the VoIP network portion, it is not precluded that calls to ANSI-136 devices may originate in the IP domain. Such calls generated from the IP domain may be delivered to the ANSI-136 MTs via the Media GW 116 (ISUP-IP media conversion) or routed directly through the VoIP infrastructures. In order to facilitate the routing of calls through the VoIP infrastructures, such infrastructures are provided with the mobility management functions that are compatible the ANSI-41 network reference model and infrastructure.

With regard to inter-system handoff, the VoIP client is preferably maintained within the new serving system. Call states associated with the VoIP client/proxy, accordingly, are transferred to the new serving system through inter-system handoff procedures.

Basic call and service processing control is also integrated using a functional independent approach. Accordingly, calls are preferably routed through an interrogating POCS structure which is provided to indicate the appropriate location for call delivery, including locations in the IP domain, to or via VoIP infrastructures. Whereas certain basic call control functions (e.g., call server function) may be implemented within the IP infrastructure (e.g., as an H.323 function), the mobile-station-specific call and service processing functions are preferably handled within the POCS network portion, with the VoIP call server being slaved to it. For this purpose, the VoIP call server implements a request/reply interface towards the POCS call and service processing control whenever subscriber services or call control events are invoked in the VoIP portion. Such events may include, for example, requests for call diverting, barring, et cetera, and may further include coincidental ANSI-41 signaling, if necessary.

Additionally, VoIP call clients are maintained preferably within the POCS infrastructures so as to optimize transmission between the POCS and IP infrastructures. The call clients may preferably inter-work with the RAN-associated signaling such that they operate as an intermediary between the ANSI-136 call control signaling and the VoIP call server. The call clients may also inter-work with the POCS call and service processing control components.

Call and service processing control relating to Intelligent Network (such as, e.g., a Wireless Intelligent Network (WIN)) functions are preferably provided through the POCS components such as the CCF 206 and SSF 208. Such call and service processing control may include coincidental ANSI-41 signaling, if necessary. Depending upon the implementational objectives, two approaches are presently envisaged:

(A) Maintaining the detection points (DPs) associated with the WIN call and service processing within the VoIP call server infrastructure. The DPs are preferably delivered through the mobility management procedures in accordance herewith. In this approach, the VoIP call server is provided with a request/reply interface with the POCS system based on WIN event triggers (e.g., call originating number, etc.). Furthermore, the SCP/service node in the POCS system may not interface directly with the VoIP call server in this approach.

(B) Maintaining the DPs within the POCS call and service processing control. In this approach, the VoIP call server implements a request/reply interface that is similar to that of the VoIP basic call control that is involved whenever subscriber services/call control events are invoked in the IP domain.

The integrated WLIP network 200 of the present invention also incorporates various other legacy ANSI-136/41 functions such as, for example, authentication, teleservices, et cetera, in addition to miscellaneous IP-specific functions, such as security protocols over H.323 or SIP realizations. Accordingly, the ANSI-136 access network and ANSI-41 core network of the POCS network portion 201 provide access, global challenge and other authentication directives, whereas the VoIP network portion 108 provides the security functions for the IP terminals. Teleservices, and other miscellaneous MS directive(s) is preferably handled within the ANSI-136/41 network, without any need for interaction with the VoIP infrastructures. Other VoIP client-server signaling and functions are preferably handled without any interaction with the ANSI-41 core.

Based on the foregoing, it should be appreciated that the exemplary embodiment of the present invention set forth above advantageously provides an integrated telecommunications network that incorporates the existing cellular elements and IP-based protocols into a seamless infrastructure for transporting cellular traffic over a packet-switched network.

Figure 2B:
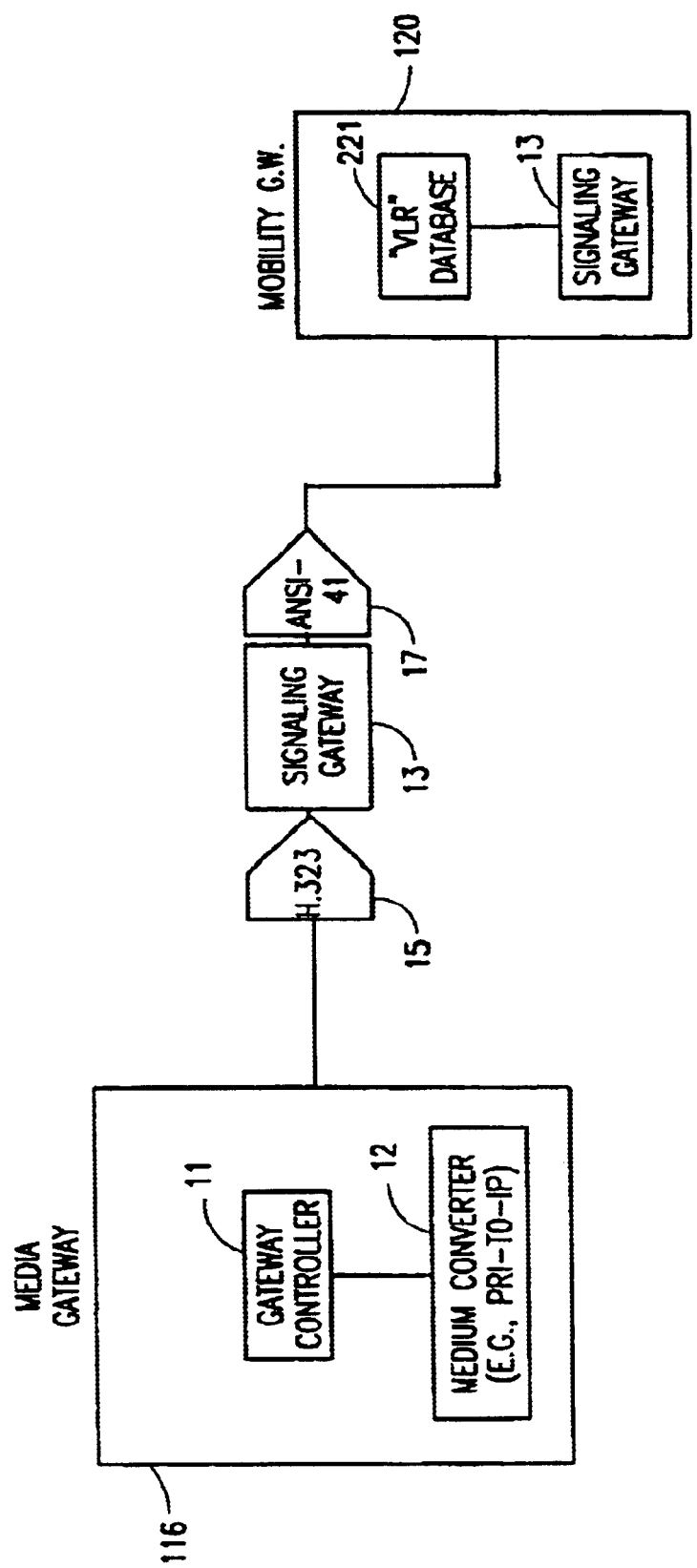
FIG. 2B depicts functional block diagrams of the various components of a gateway provided in accordance herewith.
Figure 2C:
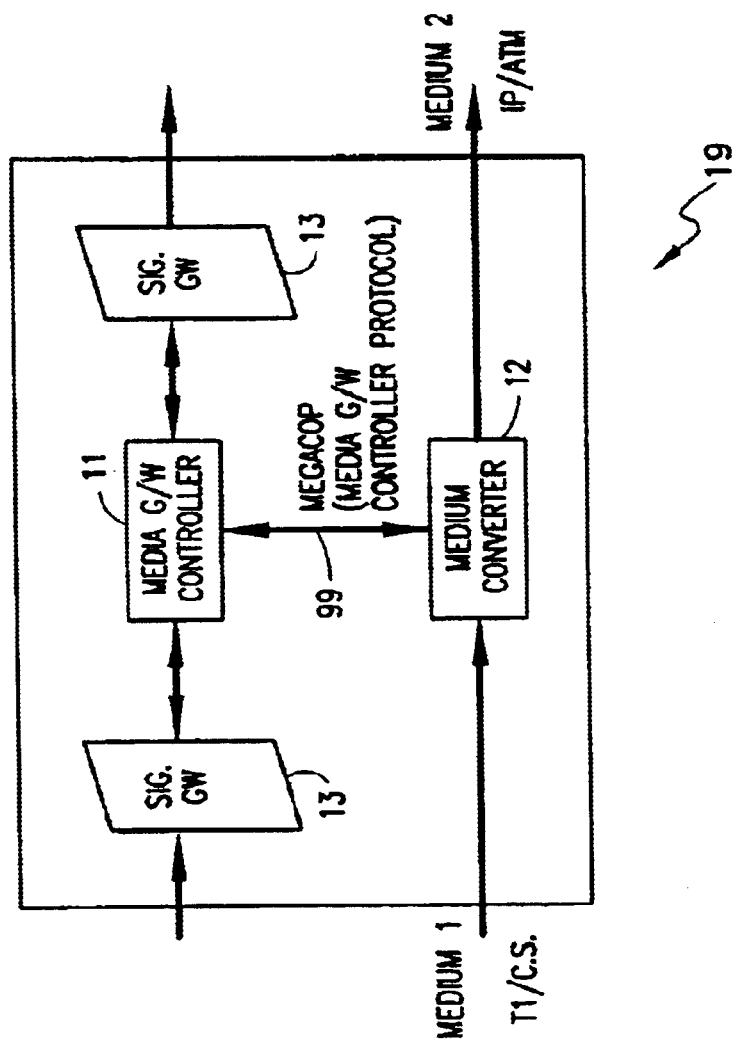
FIG. 2C depicts a functional block diagram of an exemplary embodiment of a gateway for use within an integrated WLIP network of the present invention.

FIGS. 2B and 2C depict functional block diagrams of the various gateways referred to hereinabove. The Media Gateway 116 comprises a gateway controller 11 that controls a medium converter 12, e.g., a Primary Rate Interface (PRI)-to-IP. As seen above, the Media Gateway 116 may be disposed between two network portions having different media traffic. A signaling gateway 13 is provided in accordance herewith for converting the signaling information between two network portions operating on different communications standards or protocols. For example, in the WLIP network described in detail above, signaling gateways such as those between H.323 15, and ANSI-41, 17, or between SIP and ANSI-41 may be advantageously provided. Additionally, as shown herein, a signal converting gateway may also be integrated within a Mobility Gateway such as the Mob. GW 120 described in greater detail hereinabove.

FIG. 2C depicts a gateway 19 including media gateway functionality and signaling gateway functionality integrated together. The media GW controller 11, provided between two signaling GWs 13, is coupled to the medium converter 12 for controlling the signaling conversion in conjunction with appropriate medium conversion. A media controller path 99 is effectuated between the controller 11 and medium converter 12 that is operable with a suitable Media GW Controller Protocol (MEGACOP) for such purposes. As will be seen below, such combined gateways are used advantageously in alternative embodiments of an integrated network.

In the following sub-sections, implementing specific aspects of cellular communications services and control such as, for example, call management, mobility control and roaming, call handoff, et cetera, is described in greater detail within the context of an integrated telecommunications network, preferably realized using the H.323 protocol. It should be apparent that the integrated telecommunications network and its variations are provided hereinbelow as an alternative embodiment to the network set forth above, such that the integrated telecommunications network and its variations are provided as specific implementations of an integrated telecommunications architecture where existent POCS infrastructures and PSN-IP infrastructures are essentially completely separate except for an appropriate IP interface therebetween, as the case may be. Because these alternative variations also include wireless network portions, they are referred to as WLIP network portions also and use the same reference numerals for structures similar to those described above with reference to the horizontally integrated WLIP network. Furthermore, it should be realized by one of ordinary skill in the art that these aspects as set forth below can also be handled with the Mobility GW and VoIP proxy provided in the horizontally integrated WLIP network, using appropriate control signaling mapping.

III. H.323-Cellular Network Interface

As has been explained in the Background section, one of the significant motivations for combining the POCS and IP infrastructures within an integrated framework is to obtain the advantage of inexpensive long distance calls by employing packet-based switching. While the current solutions of establishing call connections using the H.323-based IP network may be sufficient for fixed telephony networks, these solutions are plainly inadequate in the context of mobile telephony because of the ability of the subscribers to move their terminals from one MSC to another. Currently, a gatekeeper does not have the capability to monitor the location of a mobile terminal and determine the location of the nearest gateway through which the mobile terminal may be accessed. Accordingly, while a call may be routed to the intended mobile terminal through a gateway in a wireless VoIP network, the call path may still require a long distance trunk. Clearly, such a limitation curtails the provision of inexpensive long distance calls in WLIP networks.

Since the teachings of the present invention pertaining to location inquiry are exemplified within the context of a H.323-based network, a brief description of H.323 call connection and routing procedures is set forth below.

The H.323 protocol, developed originally to provide multimedia communications services over a packet-based network, presently allows PSTN subscribers to communicate with packet-based network users and vice versa. Three entities, which have been mentioned hereinabove, are of particular relevance in this context: (a) a media gateway (e.g., GW 116) which permits the interconnection between the packet-based network and the PSTN; (b) a gatekeeper used for the routing of the H.323-based calls; and (c) an H.323 terminal which preferably provides the users of a packet-based network (e.g., Internet) a device similar to a regular phone. In general, the gateways and terminals are referred to as "endpoints."

The H.323 protocol provides for several types of addresses for each user: (a) an H.323 Alias, corresponding to a symbolic name given to a particular H.323 terminal; (b) a transport address, corresponding to the IP address of the host where the H.323 terminal is located; and (c) an E.164 number, which is simply a phone number associated with the H.323 terminal. In accordance with the H.323 standard, the gatekeeper supervises all the calls delivered through the IP network, and as part of its functionality, it facilitates the matching of the terminal's E.164 number with the IP address of the host where the terminal is located. Because the IP addresses are necessary for establishing communication between different hosts on the IP network, all H.323 terminals are required to register with the gatekeeper in order to place and receive calls using their E.164 numbers. In the case where the E.164 alias of a particular H.323 terminal is unknown or unavailable at the gatekeeper, the gatekeeper may communicate via Location Request messages with other gatekeepers in order to determine the associated IP address.

Currently, there are two ways to make a call through an H.323 gateway:

(i) Two-stage dialing for calls from the PSTN to H.323: the PSTN user dials the E.164 number of the gateway and when a tone is obtained, a second E.164 number (one associated with the intended H.323 terminal) is then entered.

(ii) Prefix routing for calls from the H.323 network to the PSTN: a single IP address (corresponding to the gateway connected to the PSTN) is associated with an E.164 prefix (covered by that gateway), so all calls starting with that prefix are routed to that gateway.

The H.323 media gateway connects a telephone switching center (for example, the PSTN switching center or a cellular switching center) to the IP network. From the perspective of the H.323 IP network, the H.323 media GW preferably covers all the telephone numbers which start with a particular E.164 prefix, and accordingly, when the H.323 media GW is registered at the H.323 gatekeeper with its E.164 prefix, the gatekeeper routes calls with that E.164 prefix towards the appropriate telephone switching center. It should be noted that, typically, both an H.323 terminal and the H.323 media GW register or unregister at the gatekeeper when they are powered up or down, respectively.

In the state-of-the-art VoIP implementations provided for landline telephone connectivity, the call connection process described above is not a problem because, as is well-known, the PSTN terminals are typically always accessed through a unique switching center. However, in the context of a cellular telecommunications network, the subject matter of the present invention, it can be appreciated that the mobility of mobile subscribers from one MSC to another poses a significant problem. With the current E.164 prefix routing scheme, when a mobile subscriber roams to another MSC, the calls have to go through the mobile subscriber's home H.323 gateway and then through the home MSC associated with the mobile subscriber. From there, trunks have to be seized to the serving MSC where the mobile subscriber is visiting. Clearly, the requirement of establishing inter-MSC trunks defeats the fundamental purpose of using and integrating the IP network in the first place.

It can be readily appreciated that since the mobile subscribers register at POCS components such as, e.g., an HLR, a VLR, or both, it would be advantageous to provide the IP address information of the gateway that is closest to the serving MSC to the gatekeeper during its location inquiry. Two exemplary embodiments are set forth below.

A. H.323-HLR Interface

As pointed out in the various foregoing sub-sections, one of the fundamental objectives of the integrated WLIP network system of the present invention is to provide solutions that maximize the utilization of the VoIP network portion so that the goal of saving long distance charges may be effectively realized. Also, it has been explained that the existing solution of routing calls to the gateways that are nearest to the number being called, while adequate for fixed telephony networks, may not be effective for the mobile networks for a variety of reasons.

The present invention is directed, in an alternative aspect, to a solution which provides an HLR-H.323 interface such that the goal of saving long distance charges is realized in integrated mobile networks in a cost-effective and efficient manner.

Figure 3A:
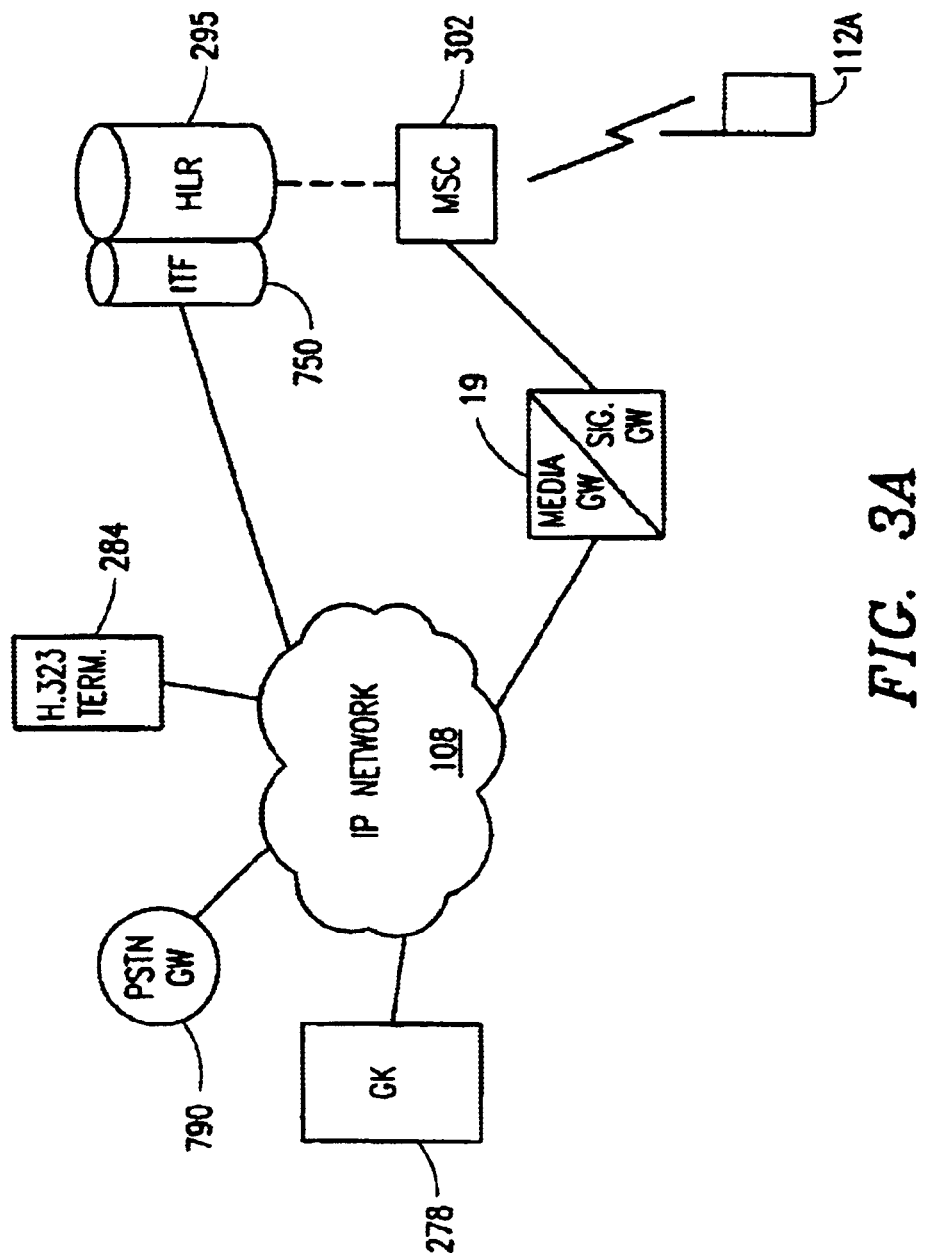
FIGS. 3A and 3B depict, respectively, a functional block diagram of a system having an enhanced Home Location Register (HLR) usable within an integrated IP network in accordance with the teachings of the present invention and a control message pathway therefor.

FIG. 3A depicts a functional block diagram of a system having an enhanced HLR for use within the integrated WLIP network system provided in accordance with the teachings of the present invention. An interface (ITF) 750 is provided with the HLR 295 such that it can interpret and support the H.323 Location Request, Location Confirm and Location Reject messages from a gatekeeper (e.g., gatekeeper 278) disposed on the VoIP network 108. It should be readily appreciated that the ITF 750 may be co-located with the HLR 298, although in some implementations, such an interface may be provided as a separate entity. In either implementation, the HLR/ITF complex is preferably provided as a "peer" with respect to the gatekeeper/s disposed on the VoIP network 108 to which it is coupled.

As part of the registration process, the serving MSC 302 proceeds with the ANSI-41 signaling mechanism in order to send the MT's location information and the address of the gateway (i.e., gateway 19) associated therewith to the HLR 295. When the gatekeeper is engaged in an Endpoint Location process because of an Admission Request message received from a PSTN gateway 790 (in the case of a PSTN subscriber) or from the H.323 terminal 284, the gatekeeper 278 issues the LRQ message to its peers/neighbors on the H.323 network. Because, the ITF/HLR entity is provided with the capability to respond to H.323 messages, the HLR returns the address of the gateway nearest to the MT 112A responsive thereto.

Figure 3B:
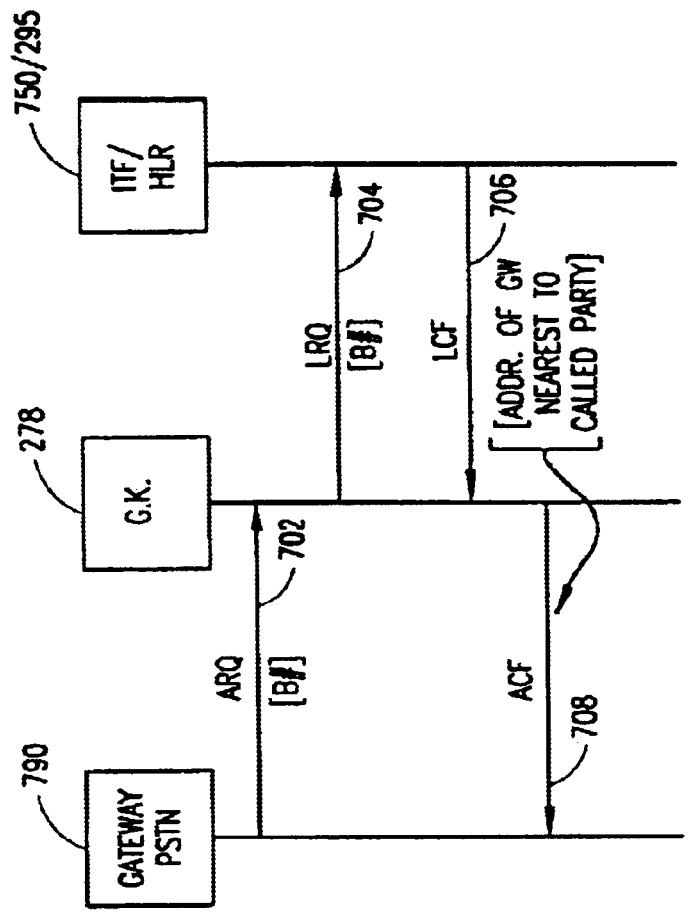

FIG. 3B depicts a control message pathway relative to the enhanced HLR system described above. The called party's B# is provided as a parameter in an ARQ message 702. Upon receiving the ARQ message, the gatekeeper 278 issues an LRQ message 704 with the B# as a parameter therein. An LCF return message 706 from the ITF/HLR 750/295 includes, in response, the address of the GW that is nearest to the serving MSC. This address information is included in an A CF return message 708 from the gatekeeper 278 to the PSTN GW 790.

It should be noted that in order to support the gatekeeper's location queries, the ITF/HLR 750/295 preferably includes GWs' IP address information corresponding to different VMSCs. Also, while the control message pathway illustrated herein references the PSTN GW 790 in particular, the mechanism described is applicable to the H.323 terminal⇌MT calls and MT⇌MT calls as well. In any event, because the address information relating to the gateway that is nearest to the serving MSC is returned (provided LCF is returned), the need for long distance trunks (and the associated tolls) is obviated.

B. Extended VLR: VLR-H.323 Interface

Figure 3C:
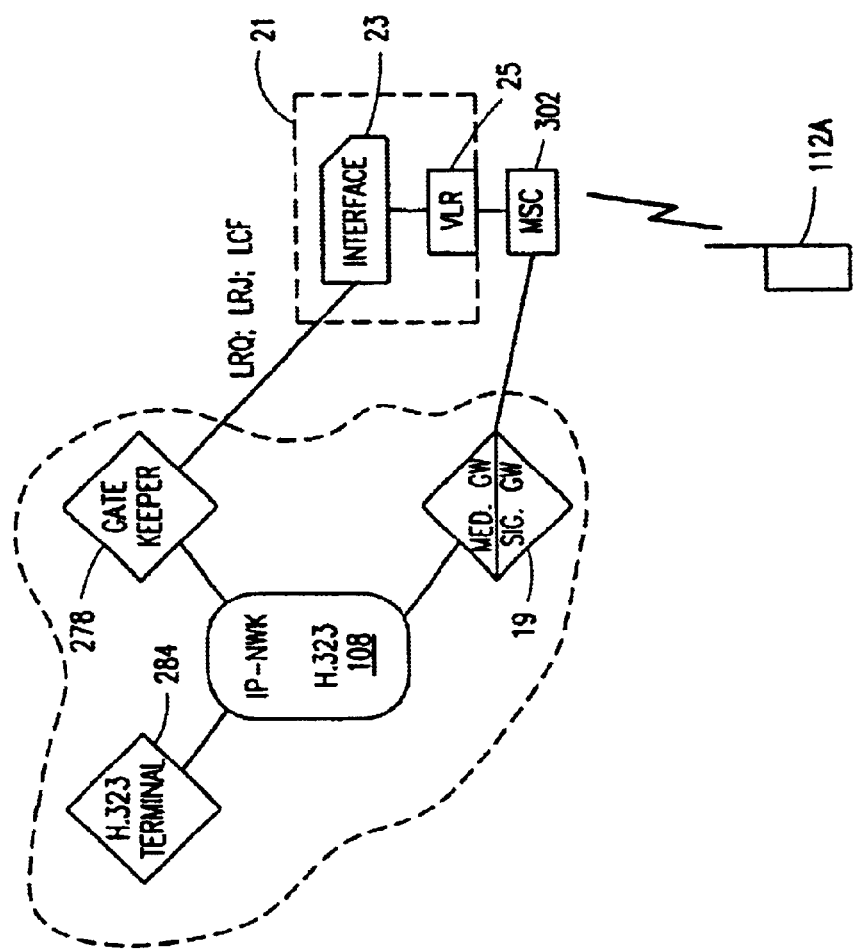
FIGS. 3C and 3D depict, respectively, two exemplary embodiments of an integrated telecommunications network having an extended Visitor Location Register (VLR) in accordance with the teachings of the present invention.

It should be apparent to one of ordinary skill in the art that similar to the HLR interface described above, a suitable VLR interface may also be implemented in an alternative embodiment for the purpose of providing the IP address of the nearest GW relative to the serving MSC. Referring now to FIG. 3C, shown therein is an exemplary embodiment of a WLIP network portion (e.g., a suitably modified portion of the WLIP network 100 shown in FIG. 2) having an extended VLR (EVLR) 21 which comprises an interface module 23 for supporting location inquiry messaging between a VLR 25 and a gatekeeper such as, for example, the gatekeeper 278 provided within the H.323 IP core network 108. The MSC 302, which is provided in this embodiment as being associated with the VLR 25, operates as the serving MSC of the MT 112A that may be a visitor. Again, a multi-functional gateway as described hereinabove (e.g., the gateway 19), is coupled to the MSC node 302 of the cellular network portion.

Figure 3D:
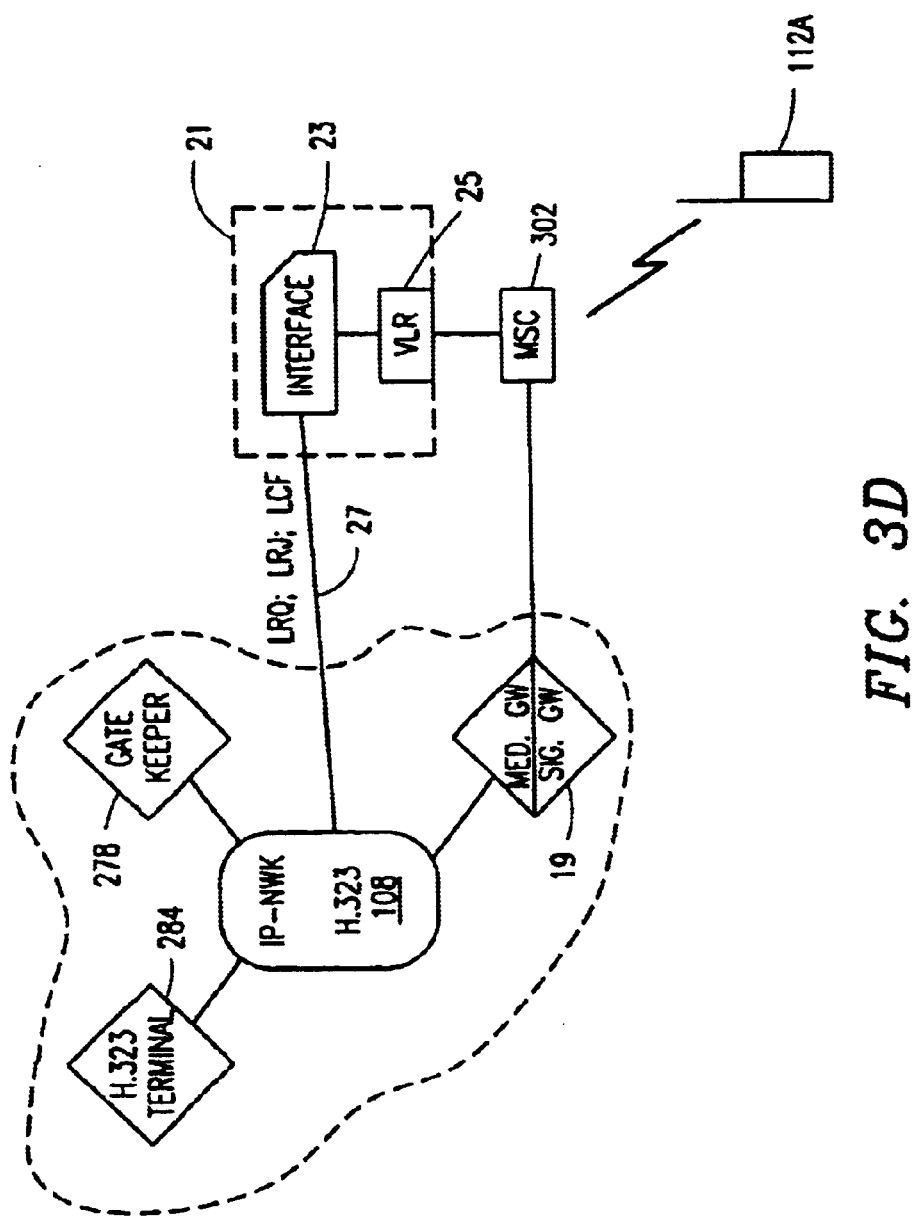

FIG. 3D depicts a variation of the network portion described above. A notable difference between the two network portions is that in FIG. 3D, the interface 23 is directly coupled to the H.323 IP core 206 via a connection path 27 that is used for transporting the location inquiry messaging issued by the between the VLR 25 and a gatekeeper such as, for example, the gatekeeper 278. Those of ordinary skill in the art should realize upon reference hereto that such a direct connection between the EVLR is akin to the direct HLR interface described hereinbefore.

Figure 3E:
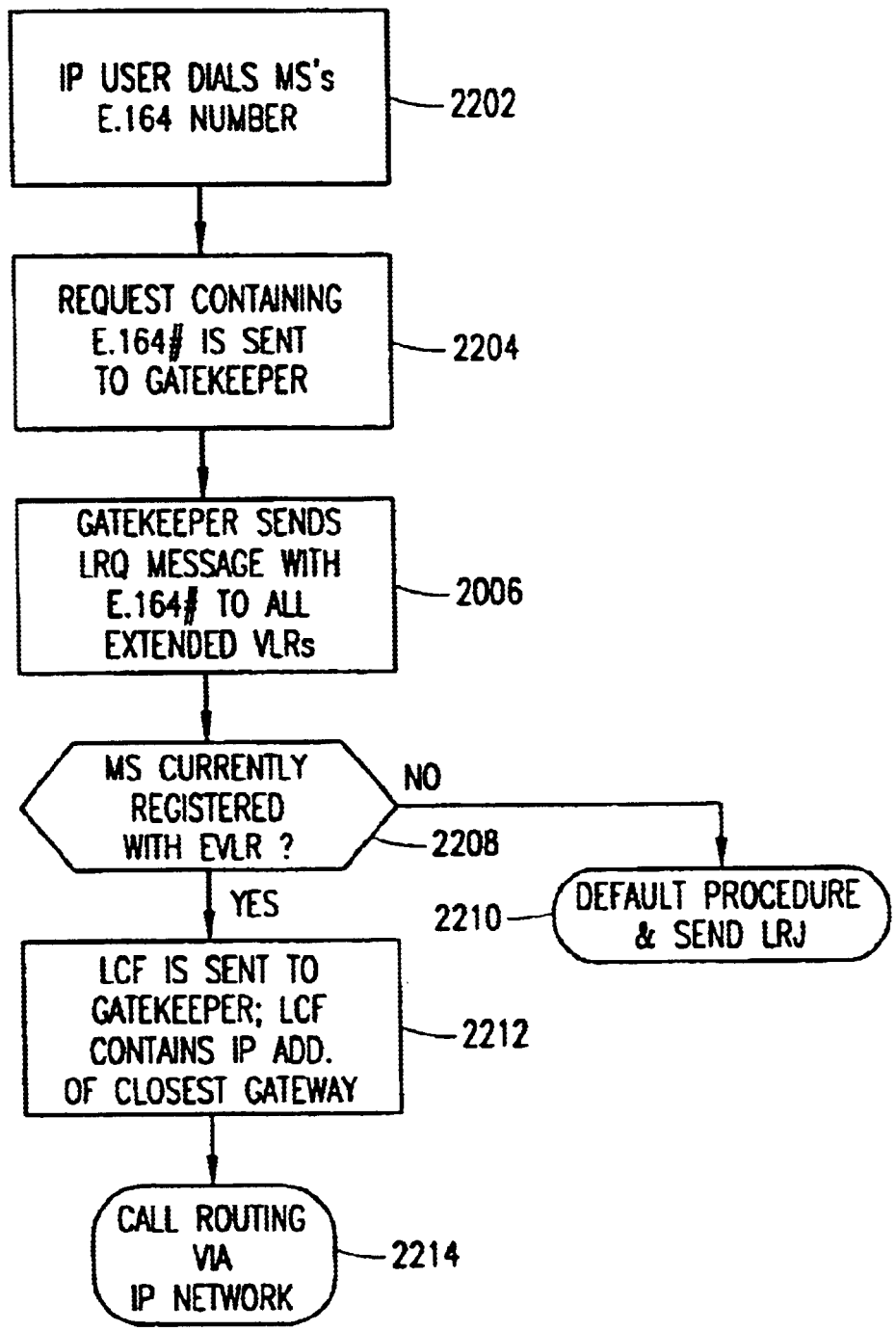
FIG. 3E depicts a flow chart for an exemplary embodiment of a call routing method using the extended VLR disposed in an integrated telecommunications network.

FIG. 3E depicts a flow chart of an exemplary embodiment of a call routing scenario using the extended VLR 21 in accordance with the teachings of the present invention, wherein an in-coming call is originated by an IP user. It should be realized by those skilled in the art that the call routing scenario set forth herein may be used in either of the WLIP network portions described above. Furthermore, in other embodiments, the in-coming calls may be originated by other users, e.g., PSTN phone users, other mobile subscribers, etc.

Continuing to refer to the flow chart of the exemplary embodiment set forth herein, an IP user (e.g., the H.323 user operating the terminal 284) dials the E.164 number associated with the MS or MT (step 2202). A request message containing the E.164 number is subsequently sent (step 2204) to the gatekeeper 278. Because the gatekeeper 278 does not know the location of the MS (i.e., it does not have the IP address information of the gateway to use), it sends a Location Request (LRQ) message containing the E.164 number to all extended VLRs (EVLRs) that it is aware of (step 2206). In response to the LRQ message, the EVLRs verify their databases to determine if the MS is currently registered therein, as provided in the decision block 2208.

If the MS is not registered at any of the EVLRs queried by the gatekeeper, a Location Reject (LRJ) message is sent back to the gatekeeper which may then preferably employ a default procedure of its choice (step 2210). On the other hand, if the MS is registered at an EVLR, a Location Confirm (LCF) message is returned thereby (step 2212). The LCF message preferably contains the IP address information of the gateway (e.g., gateway 19) that is nearest to the serving MSC. Once the gatekeeper receives the LCF message, the call is then routed using the IP address information of the gateway contained therein.

Based on the foregoing, it can be readily appreciated that the provision of an EVLR in accordance herewith allows H.323 users to simply dial the E.164 number of a mobile station to reach a cellular subscriber. Furthermore, the EVLR of the present invention maximizes the utilization of the IP network so that the goal of saving long distance charges is effectively realized.

It should be noted that while the exemplary call routing scenario illustrated herein pertains to a call originated by an IP user, the method described is applicable to calls originated by other subscribers as well, e.g., PSTN or POCS users. Also, in some implementations, the LRQ message from the gatekeeper that receives the request with the E.164 number may be propagated to other gatekeepers such that they, in turn, may query their own EVLRS for the nearest gateway's IP address information. Furthermore, the protocol converter functionality described hereinabove is amenable to an MGW implementation as well.

IV. Handoff System and Method

First Embodiment

It should be readily apparent to one of ordinary skill in the art that in the integrated WLIP network system of the present invention, there arises a need for an appropriate solution which provides for inter-gateway handoff when an MT roams from one serving area to another within the existing infrastructure of the POCS network portion.

Figure 4:
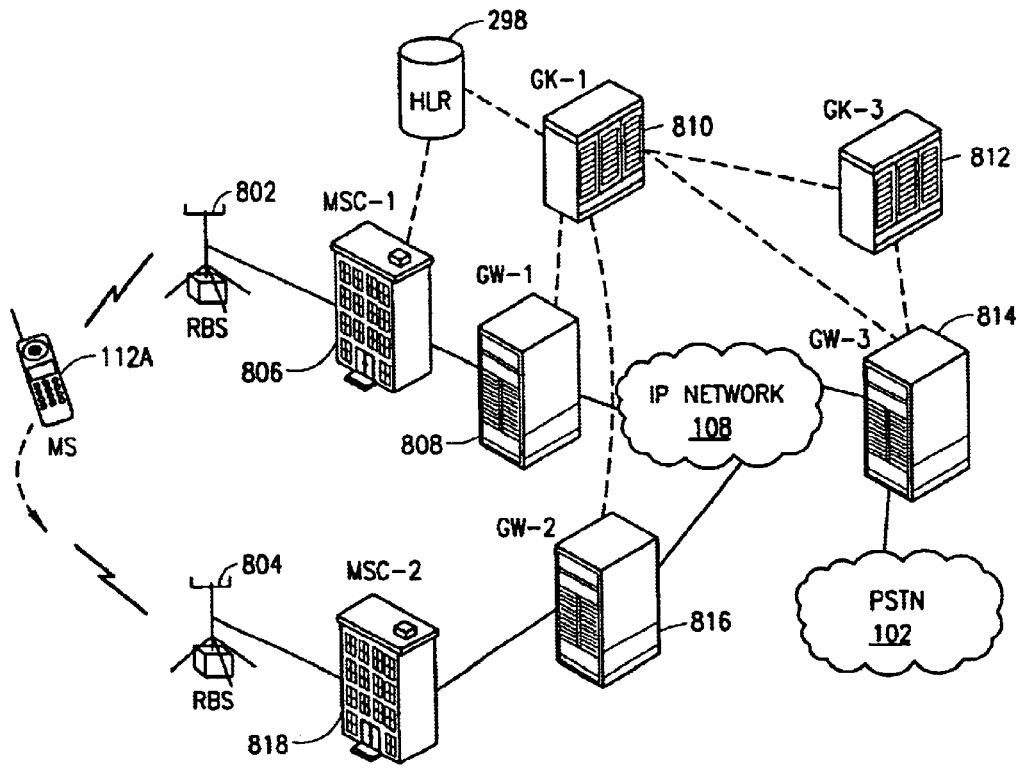
FIGS. 4 and 5 depict, respectively, a functional block diagram of an exemplary embodiment of a handoff mechanism and a control message pathway therefor.

To establish the framework for a presently preferred exemplary embodiment of an inter-gateway handoff solution provided herein, consider FIG. 4 which depicts a functional block diagram of an appropriate segment of an integrated IP network, e.g., the WLIP network system described hereinabove. The MS 112A, having an air-interface with the BS 802, is first provided to be in an established call path with GW-3 814 via MSC-1 806, GW-1 808, and the IP network 108. Before the call path is set up, appropriate negotiations have to be done among the involved entities, i.e., GW-1 808, GW-3 814 and gatekeeper GK-3) 812, by sending back and forth the RAS control, call control (preferably based on the Q.931 messaging) and session control (based on H.225) messages. When the MS 112A moves into the serving area of the target MSC-2 818, inter-gateway handoff needs to be initiated between the GW-1 808 and the target gateway (GW-2) 816 associated with the target MSC-2 818.

To perform the inter-gateway handoff in accordance with the conventional procedures, what is done is as follows. First, a HANDOFF message is sent from MSC-1 806 to MSC-2 818. After receiving the return message (handoff), MSC-1 sends a Facilities Directive (FACDIR) message to MSC-2. Thereafter, upon receipt of the return message (facdir), MSC-1 issues a HANDOFF ORDER to the MS 112A. Once the MS is received by the MSC-2 on the designated channel, the connection between GW-1 and GW-3 has to be released, and the connection between GW-2 and GW-3 has to be set up. However, as can be readily appreciated, the connection between GW-2 and GW-3 cannot be set up until proper negotiation messages have been sent back and forth, which take up enough time such that the ensuing time delay affects the quality of the call.

To overcome the deficiency of the conventional inter-gateway handoff mechanism set forth above, the present invention provides a novel method of handoff as follows. First, the HANDOFF message is sent from MSC-1 to MSC-2. After receiving the handoff return message, MSC-1 sends the FACDIR message to MSC-2. Upon receipt of the facdir message, instead of sending the HANDOFF ORDER to the MS, MSC-1 notifies GW-3, via GK-1, GW-1 and GK-3, to set up the connection with GW-2 using the same codec and logical channel as that of the connection between GW-1 and GW-3. After the connection between GW-2 and GW-3 is set up (at this point, GW-3 is in communication with both GW-1 and GW-2), MSC-1 sends a HANDOFF ORDER to the MS. Once the MS is received by the MSC-2 on the designated channel, the connection between GW-1 and GW-3 can be released. The inter-gateway handoff is completed thereby without any time delay because the negotiation process with the target GW has been performed already, prior to breaking the connection with the first GW.

Figure 5:
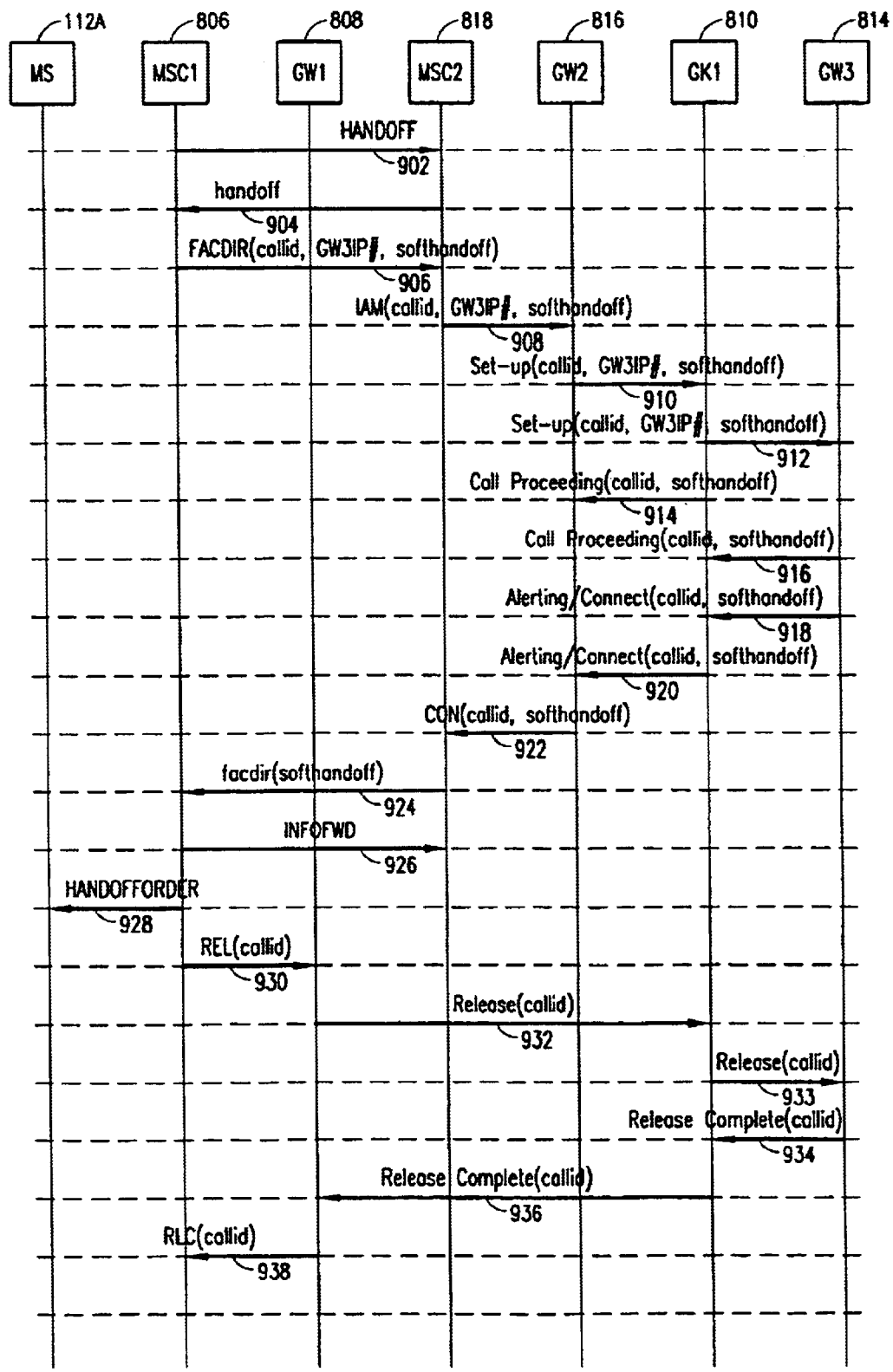

FIG. 5 depicts a control message pathway for the inter-gateway handoff method described above. As can be seen, the HANDOFF ORDER 928 is not issued until the connection is made between GW-2 816 and GW-3 814. The stepwise description of the control message pathway is provided immediately hereinbelow.

MSC-1 806 sends a HANDOFF message 902 to all adjacent MSCs for voice quality measurement. The response from MSC-2 818, the handoff return message 904, indicates that the target MSC has the appropriate quality measurements (e.g., signal strength, et cetera) and that a handoff may be performed. MSC-1 orders a handoff directive by issuing the ANSI-41 FACDIR message 906 to MSC-2, along with the IP address of GW-3 814, and the ongoing called between GW-1 808 and GW-3 814. A "soft" handoff ("soft" because target connection is made before the original connection is released) indication (soft handoff) is also included therein as a new parameter.

Upon receipt of the FACDIR message 906, MSC-2 818 sends an ISUP Initial Address Message (IAM) 908 to its gateway (GW-2 816) for handoff connection between GW-2 816 and GW-3 814. Subsequently, GW-2 sends an H.225 Set-Up message 910 to the gatekeeper, GK-1 810, including the above-mentioned parameters. The gatekeeper, in turn, passes the Set-Up message to GW-3 814 with all the parameters received from GW-2 816 (path 912).

Thereafter, an H.225 Call Proceeding message 914 is returned from the gate keeper 810 to GW-2 816 in accordance with the H.225 call setup procedure. Furthermore, an H.225 Call Proceeding message 916 is returned from GW-3 814 to GK-1 810 as well. GW-3 814 also sends additional H.225 messages (Alert and Connect messages) to the gatekeeper 810 upon receiving the soft handoff parameter. This messaging (path 918), which contains the soft handoff indication, is performed in order to indicate that GW-3 814 will broadcast the source of callid to both GW-1 808 and GW-2 816 at the same time. Upon receiving the Alert/Connect messaging from GW-3 814, the gatekeeper 810 passes that information to GW-2 816 via path 920. An ISUP Connection (CON) message 922 containing the soft handoff indication is sent back to MSC-2 818.

Continuing to refer to FIG. 5, responsive to the ISUP CON message with the soft handoff indication, MSC-2 818 sends an ANSI-41 facdir message 924 to MSC-1 806 to confirm the handoff procedure. In an exemplary embodiment of this aspect of the present invention, a timer (and an associated timeout period) may be provided in the handoff procedure to monitor the time required for the GW-2⇆GW-3 connection setup. Upon the expiration of the timeout period, a handoff failure indication may be provided if the connection is not made.

Once the ANSI-41 facdir message 924 is received, MSC-1 806 sends an INFOFWD message 926 to MSC-2 818 with the subscriber profiles of the MS 112A that is about to be handed over to the target MSC (i.e., MSC-2 818). Thereafter, the originating MSC (MSC-1 806) orders the MS 112A to perform the handoff by sending a HANDOFFORDER message to it via path 928. Once the HANDOFFORDER message is sent, MSC-1 806 issues an ISUP Release (REL) message 930 with the callid parameter to GW-1 808 in order to release the connection involving MSC-1 806, GW-1 808 and GW-3 814. Responsive thereto, GW-1 808 sends an H.225 Release message 932 with the callid parameter to the gatekeeper 810, which in turn passes it to GW-3 814 via path 933. Subsequently, GW-3 814 responds to the Release message by returning a Release Complete message 934 to the gatekeeper 810. The Release Complete message is then forwarded to GW-1 808 via path 936, which in turn indicates the release completion by sending the ISUP Release Complete (RLC) message 938 to the MSC-1 806.

V. Handoff System and Method

Second Embodiment

The inter-system handoff method described in the foregoing involves handing off an MT or MS between two legacy POCS radio base stations (RBS) such as, for example, RBS 802 and RBS 804. Moreover, as has been explained with respect to that embodiment of the handoff method, there is a time delay associated with the inter-gateway negotiations necessary for the make-before-break handoff.

It can be realized that in some implementations, the handoff embodiment described above may not be a satisfactory solution. First, when advanced radio base stations such as, for example, software-defined radio (SDR) base stations, that are IP-compatible directly (i.e., having IP-connectivity without a separate gateway) are used in the cellular networks, the inter-gateway negotiation process described in the foregoing is inappropriate and inapplicable. Second, while the inter-gateway negotiations are performed before the existing call path is released thus assuring a cleaner target call path connection, because of the inherent time delay, a handoff with acceptable quality may not always be assured. The time delay factor is especially relevant when long distances exist between the serving and anchor gateways, typically on the order of hundreds of miles.

Figure 6:
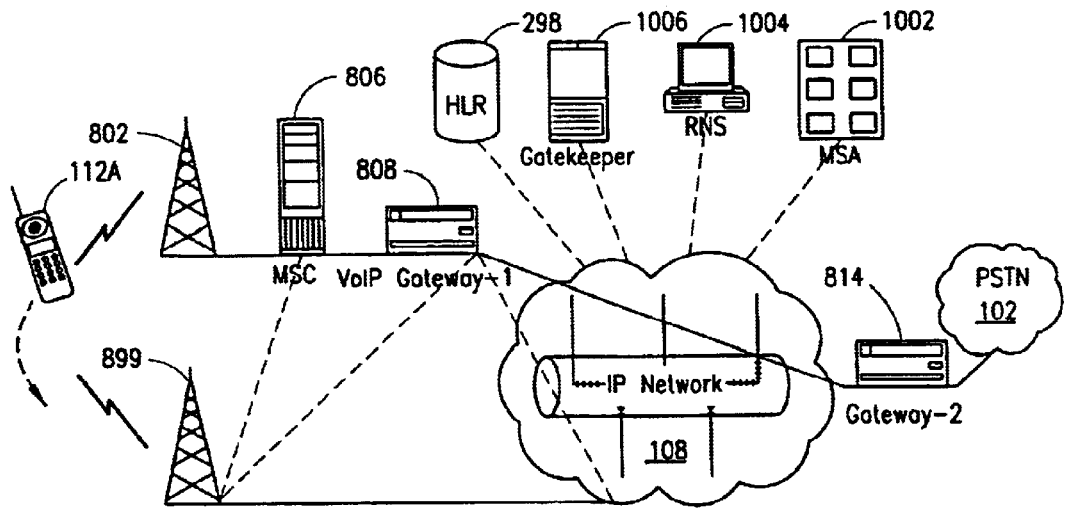
FIGS. 6 and 7 depict, respectively, a functional block diagram of another exemplary embodiment of a handoff mechanism and a control message pathway therefor.

FIG. 6 depicts a functional block diagram of a relevant portion of the integrated WLIP network system which exemplifies a second embodiment of the inter-system handoff method and system. In this embodiment, the MS 112A is engaged in a conversation with the other party (cellular, PSTN or H.323 terminal-based; although the PSTN network portion 102 is exemplified herein) via the legacy RBS 802, legacy MSC 806 and GW-1 808. GW-2 814 is provided as the other party's gateway to the IP network 108. An SDR RBS 899, which is provided to be the target station to which a handoff is to be initiated, is directly connected to the IP network 108. A Mobile Switching Application (MSA) 1002 which is essentially the switching control part of a legacy MSC without the radio services component, but IP-compatible, is also disposed directly on the IP network 108. All call control functionality relating to the SDR RBS 899 is provided by the MSA 1002. A gatekeeper 1006 and a Radio Network System (RNS) 1004 are also provided in accordance with the teachings herein.

When the MS 112A roams into the serving area of the SDR RBS 899, an inter-IP handoff needs to be initiated because the SDR RBS is directly connected to the IP network 108 with its own IP address. In accordance with the teachings of the present invention, the gateway associated with the legacy MSC 806, i.e., GW-1 808, is provided with the functionality of both a serving GW and an anchor GW for the purpose of effectuating the necessary inter-IP handoff. In other words, GW-1 also operates as a "virtual" anchor gateway for the SDR RBS 899 when the call path is handed over to it pursuant to the roaming of MS 112A into its serving area.

The handoff system and method in this exemplary embodiment provides that when the ANSI-41 facdir response message is returned from the MSA 1002, the serving MSC 806 passes the appropriate information (callid parameter, IP address of the SDR RBS, and a "virtual anchor" handoff indication (vahandoff)) to the serving gatekeeper 1006. Responsive thereto, the gatekeeper 1006 orders the virtual anchor GW to establish a logical channel between it and the target SDR RBS 899. When the connection is set up, the gatekeeper 1006 orders a connection between the virtual anchor GW and the serving GW. It should be appreciated that the virtual anchor GW is located at the same physical node as the anchor GW (i.e., GW-1 808). The MSC 806 is then notified to send the HANDOFFORDER to the MS 112A. Once the MS 112A is received by the SDR RBS 899 on the designated voice channel, the connection involving the legacy BS 802, MSC 806, and serving GW 808 is disconnected and the handoff procedure is completed.

Figure 7:
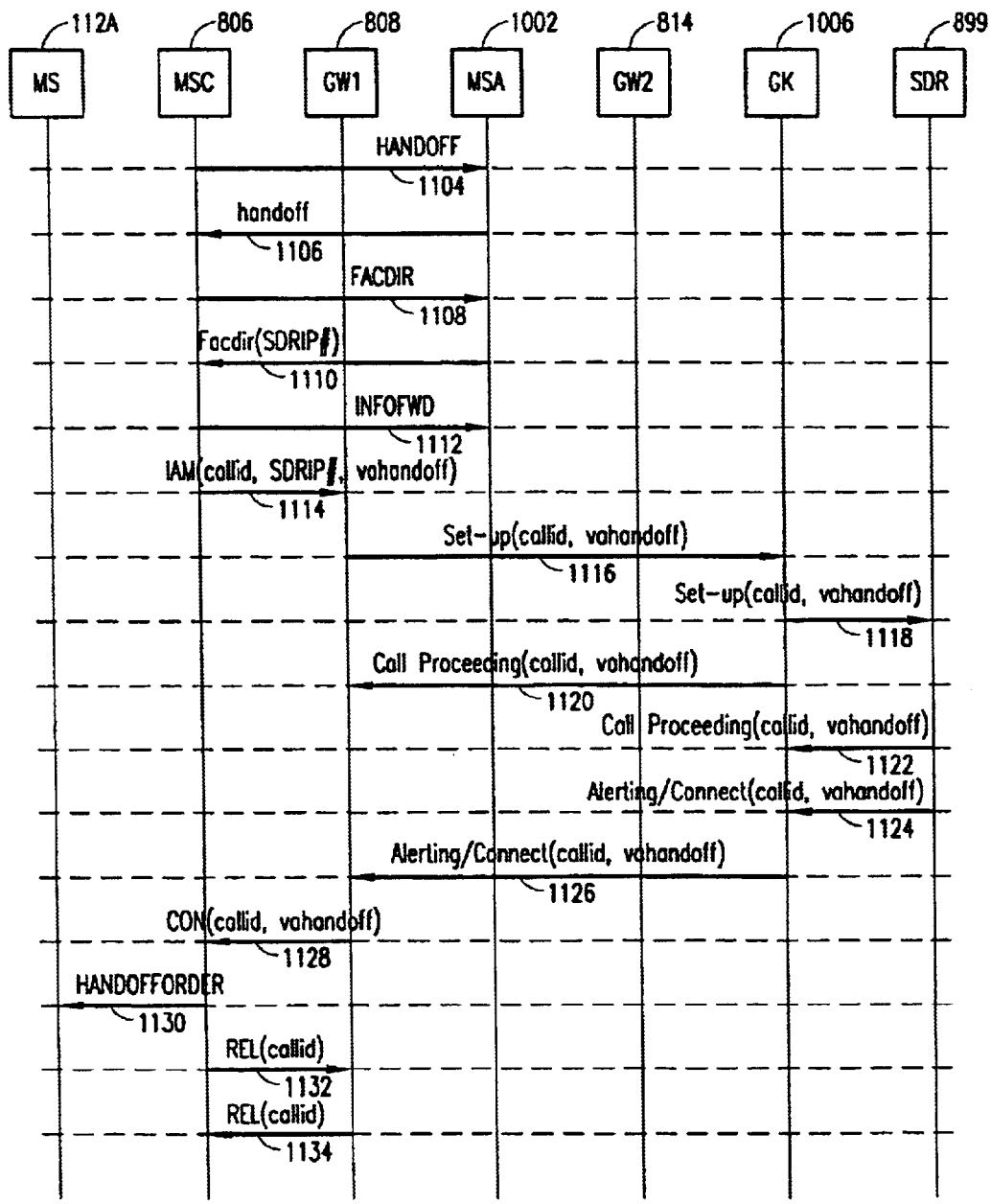

FIG. 7 depicts a control message pathway for the method of effectuating a virtual anchor inter-system handoff described in the foregoing. It can be readily seen that the control messages 1104–1134 used in this exemplary embodiment are similar to those described in the previous embodiment, as depicted in FIG. 5. Accordingly, for the sake of concision, the detailed description of these messages will not be repeated here.

Based upon the foregoing, it should now be apparent to those of ordinary skill in the art that no inter-gateway negotiations are necessary for the purpose of effectuating an inter-system handoff because the virtual anchor and the serving gateways are essentially the same node on the IP network 108. Furthermore, the time delay associated with inter-gateway negotiations is essentially eliminated as well. Finally, the inter-system handoff embodiment described herein is applicable to newer and more advanced SDR RBS systems.

VI. Handoff System and Method

Third Embodiment

The present invention provides yet another embodiment of the inter-system handoff method in accordance with the teachings herein. As can be appreciated upon reference to the description set forth above with respect to FIGS. 4 and 5, the MS is not ordered for the handoff until the inter-gateway negotiations and a suitable target connection path have been established. In other words, the conversation in which the MS is engaged with the other party (cellular or PSTN subscriber, for example) still continues via the air interface with the first BS and the serving MSC. A variation may be had by transferring the MS to the available BS before the inter-gateway connection is established, but keeping the serving MSC in the call path via an inter-MSC trunk path and maintaining that trunk path for a pre-defined time period. The time period allows the necessary inter-gateway connection to be made, so that the inter-MSC trunk may be released thereafter.

Figure 8:
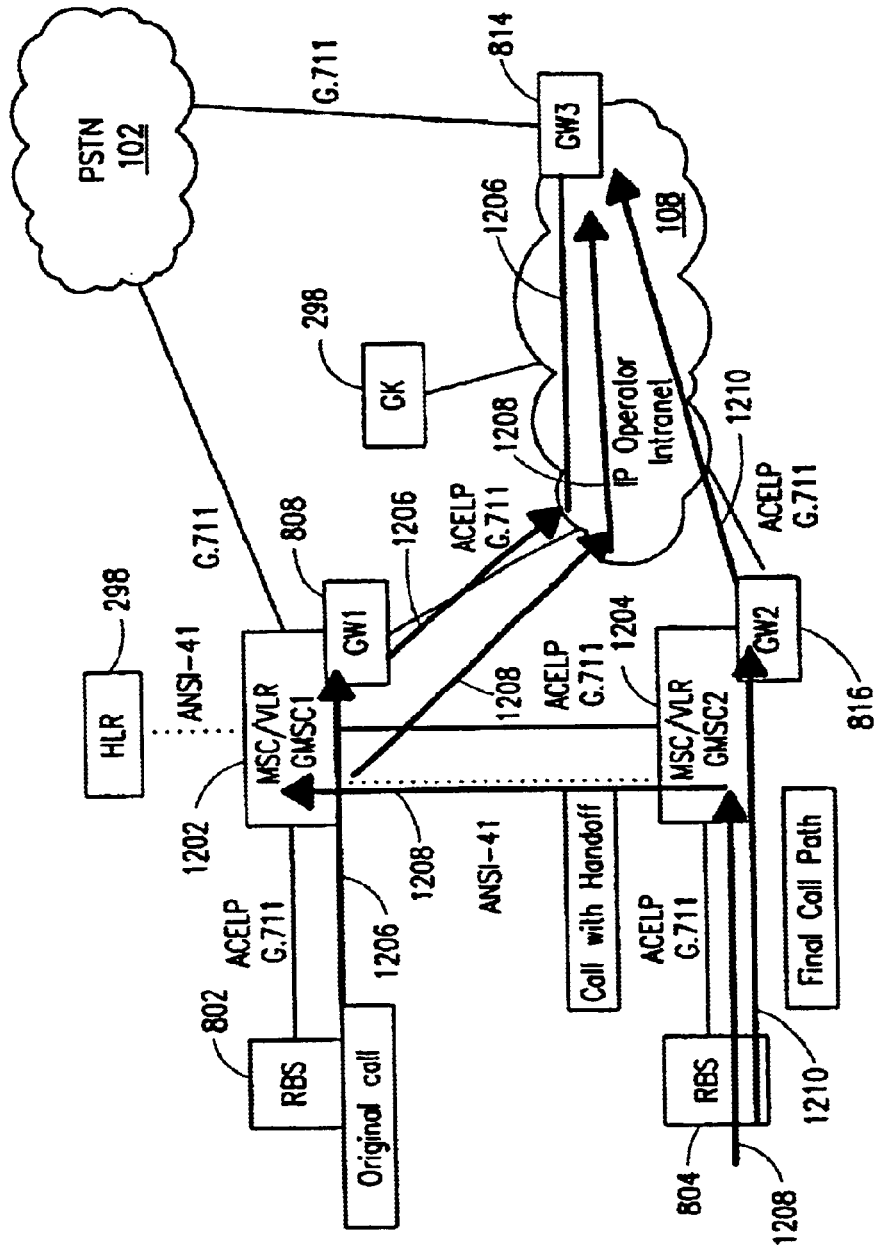
FIGS. 8 and 9 depict, respectively, a functional block diagram of yet another exemplary embodiment of a handoff mechanism and a control message pathway therefor.

FIG. 8 depicts a functional block diagram of a third exemplary embodiment of the inter-system handoff procedure in accordance with the teachings of the present invention. The original call 1206 is established via RBS 802, MSC/VLR/GMSC1 1202 and GW-1 808. The IP network 108 is provided with GW-3 for the connection through the PSTN portion 102, associated with the other party in the call. When the MS roams into the serving area of the target RBS (RBS 804), the call is handed over thereto after suitable voice/signal quality determinations. An intermediate call path 1208 is thus established from RBS 804 to the PSTN portion 102, which still involves the MSC/VLR/GMSC1 complex 1202 and GW-1 808. The ANSI-41 path segment between MSC/VLRGMSC1 complex 1202 and MSC/VLRGMSC2 complex 1204 is the temporary inter-MSC trunk established for the purpose of maintaining the call while the inter-gateway negotiations, such as those described in greater detail hereinabove, take place. After the completion of the necessary negotiations, the inter-MSC trunk is released such that a final call path, path 1210, is established involving the MSC/VLRGMSC2 complex 1204, GW-2 816 and GW-3 814.

Figure 9:
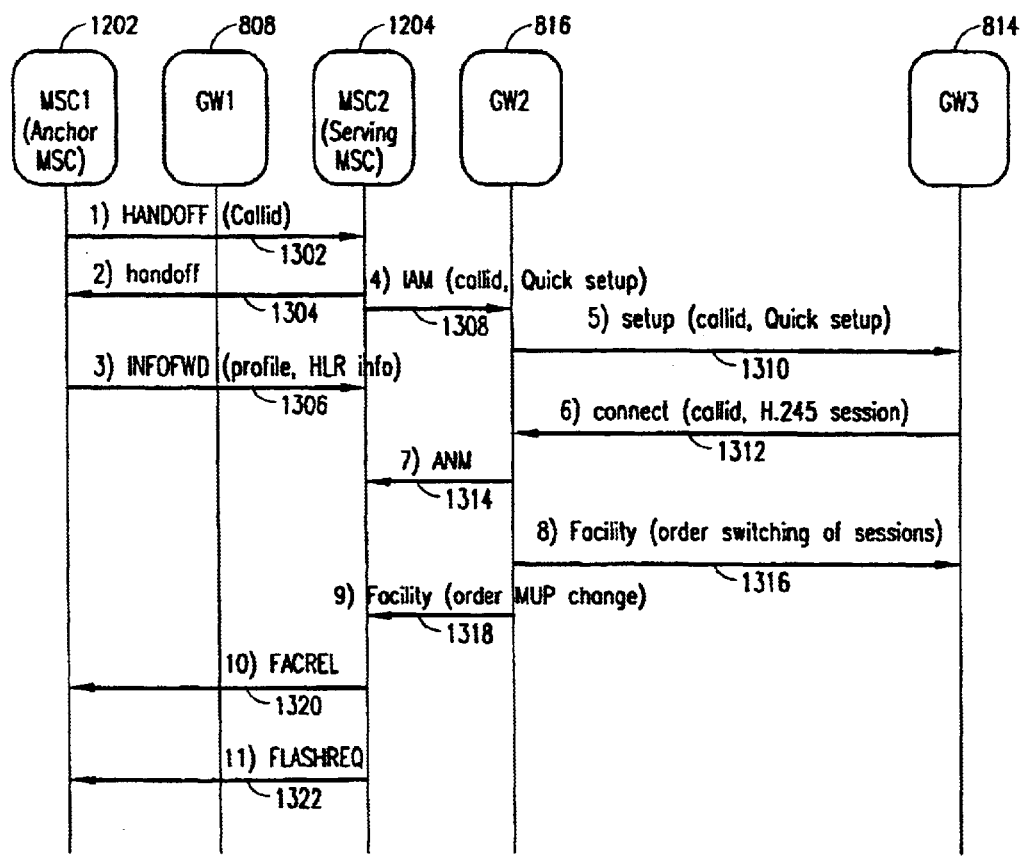

FIG. 9 depicts a control message pathway which depicts in greater detail the various messages relating to the inter-system handoff embodiment set forth above. The ANSI-41 HANDOFF message 1302 (including the callid parameter) is issued from the MSC1 complex 1202 to the MSC2 complex 1204. Responsive thereto, the MSC2 complex 1204 (serving MSC) returns a handoff return message 1304 is sent back to the MSC1 complex 1202 (anchor MSC). The call is then continued using the temporary trunk set up between the serving and anchor MSCs. In the meantime, the serving MSC attempts to establish a call through GW-2 816, with the attendant inter-gateway negotiations in place.

Continuing to refer to FIG. 9, the anchor MSC 1202 subsequently sends an INFOFWD 1306 message to the serving MSC 1204 and includes the mobile subscriber's profile and HLR information. The serving MSC issues an ISUP IAM message 1308 to GW-2 816, which includes the callid parameter and an instruction for GW-2 to use a Quick Setup procedure with GW-3 814. In response thereto, GW-2 816 establishes a Q.931 set up call (path 1310) with GW-3 814. This message includes a parameter to order GW-3 814 to use the same callid for the call, to immediately accept the call (with a Connect return message), and to establish an association between the callid and all H.245 sessions used therein (that is, current session and upcoming sessions). A Connect message 1312 is accordingly returned from GW-3 814 to GW-2 816, including its H.245 address and associating the new session with the same callid. Thereafter, GW-2 816 responds to the serving MSC 1204 with an Answer Message (ANM) message 1314 indicating that the call has been accepted.

A new H.245 session is now established between GW-2 816 and GW-3 814. Using a Facility message 1316, GW-2 816 instructs switching of sessions. Thereafter, GW-2 816 sends a message (e.g., a Facility message) via path 1318 to the serving MSC 1204 to inform the serving MSC that inter-gateway sessions have been switched. In response to the MUP Change parameter in the message, the serving MSC 1204 performs a MUP change in the Group Switch, after which the audio conversation is carried between GW-2 and GW-3.

Still continuing to refer to FIG. 9, the serving MSC subsequently sends a FACREL message 1320 to the anchor MSC 1202 to release the resources but to keep the Toll Ticket (TT) opened. When the call terminates, the serving MSC sends the anchor MSC a FLASHREQ message (path 1322) with a code to indicate that the call is completed and the time duration of the call is to be stamped on the TT prior to its closure.

Based upon the foregoing, it should be realized that by establishing an inter-MSC trunk for the interim purpose of maintaining the call, the time delay constraint on the inter-gateway negotiations is effectively removed. That is, even where the gateways are separated by long distances or where the time delay is too long for the call to survive the handoff, the inter-MSC trunk may be kept in place, thereby virtually guaranteeing a high-quality handoff.

VII. Elimination of Roaming Numbers in the WLIP Network

In the existing POCS infrastructures, when a mobile subscriber roams into a visited service area, the mobile subscriber is assigned a Temporary Location Directory Number (TLDN) or "roaming number" by the operator of the serving MSC. Typically, the roaming numbers are routable numbers purchased from PSTN operators for the specific purpose of routing calls terminating with the visiting mobile subscribers' telephone numbers.

It is well-known in the telecommunications art that routable numbers are expensive. Accordingly, incentives exist for switch operators to minimize, or eliminate altogether, the need for purchasing such routable numbers. The present invention provides a system and method for eliminating roaming numbers for routing calls in the integrated WLIP network.

Figure 10:
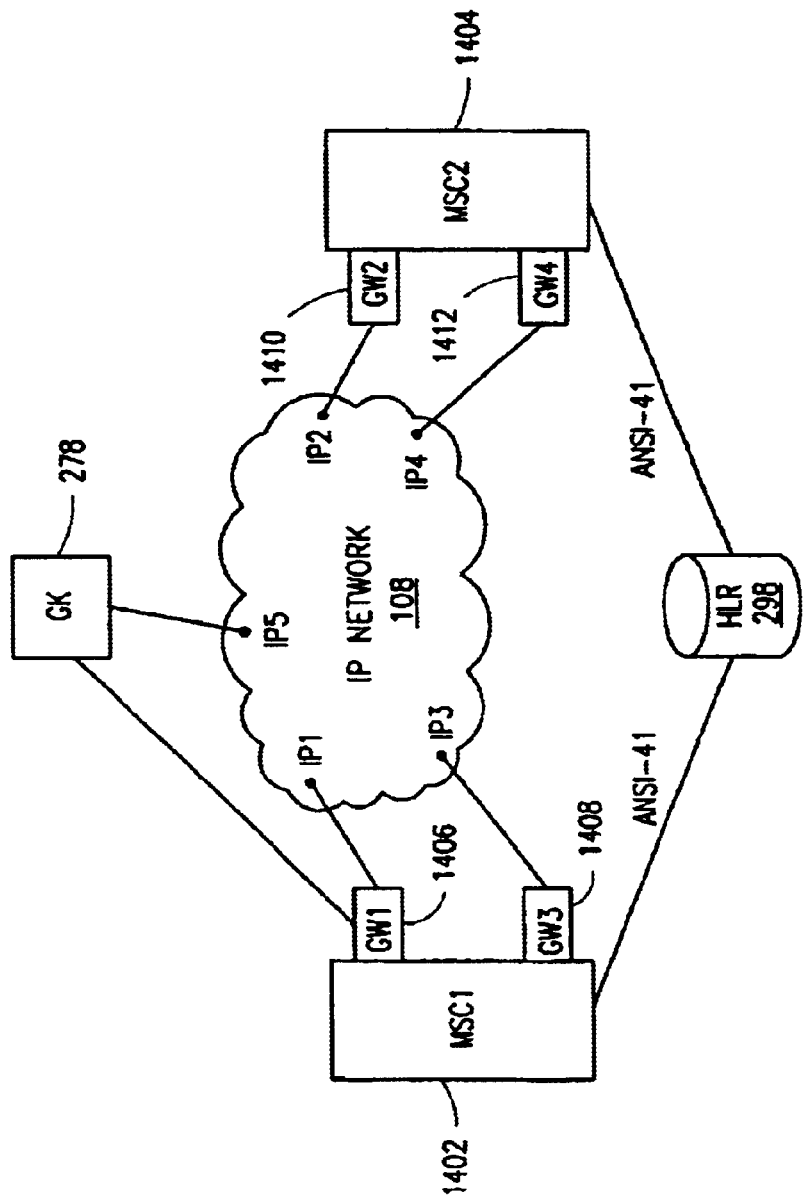
FIGS. 10 and 11 depict, respectively, a call delivery system for cellular calls delivered over the VoIP network without roaming numbers and a control message pathway therefor.

FIG. 10 depicts a functional block diagram of a relevant portion of the now-familiar WLIP network provided in accordance with the teachings herein. The IP network portion 108 is provided with the gatekeeper 278 in a conventional manner, although it now includes novel functionality described in greater detail hereinbelow. The MSCs are equipped with at least one gateway that routes the calls over the IP network portion 108. In the depicted exemplary embodiment, MSC1 1402 is provided with GW1 1406 and GW3 1408. Similarly, MSC2 1404 is provided with GW2 1410 and GW4 1412.

One of the MSCs may be disposed in the system as a gateway MSC (GMSC) for the purposes of the conventional POCS infrastructure. A PSTN-originating call or a mobile-originating call destined for the mobile subscriber (MS) visiting the service area of either MSC1 1402 or MSC2 1404 is treated in the various applicable nodes of the system depicted in FIG. 10 as follows.

When the call is received in the GMSC, it issues an ANSI-41 LOCREQ_Invoke to the HLR 298. In turn, the HLR sends a ROUTREQ_Invoke message to the visiting MSC (VMSC) where the MS is roaming. Upon the receipt of the ROUTREQ_Invoke message, the VMSC establishes an internal record and assigns to it a non-routable number based on the location of the MS. It should be realized that the non-routable number can be any number that is generated under the control of the VMSC's operator. Subsequently, the VMSC returns a routreq_return_result message to the HLR 298 with the non-routable number, which is then forwarded via a locreq_return_result message to the GMSC. The non-routable number is stored by the GMSC in the call record and issues a Q.931 Call Setup message to the gatekeeper 278 which includes the called MS's telephone number (B-number) and the non-routable number provided by the VMSC.

The database in the gatekeeper 278 is populated in accordance with the needs of the network and is provided with the address translation capability whereby the non-routable numbers are mapped to the appropriate IP addresses. Upon receiving the Call Setup from the GMSC, the gatekeeper issues a Q.931 Setup request to the gateway associated with the VMSC, with the appropriate IP address information included therein. The gateway then routes the call over the IP network portion 108 for call delivery to the called MS.

Figure 11:
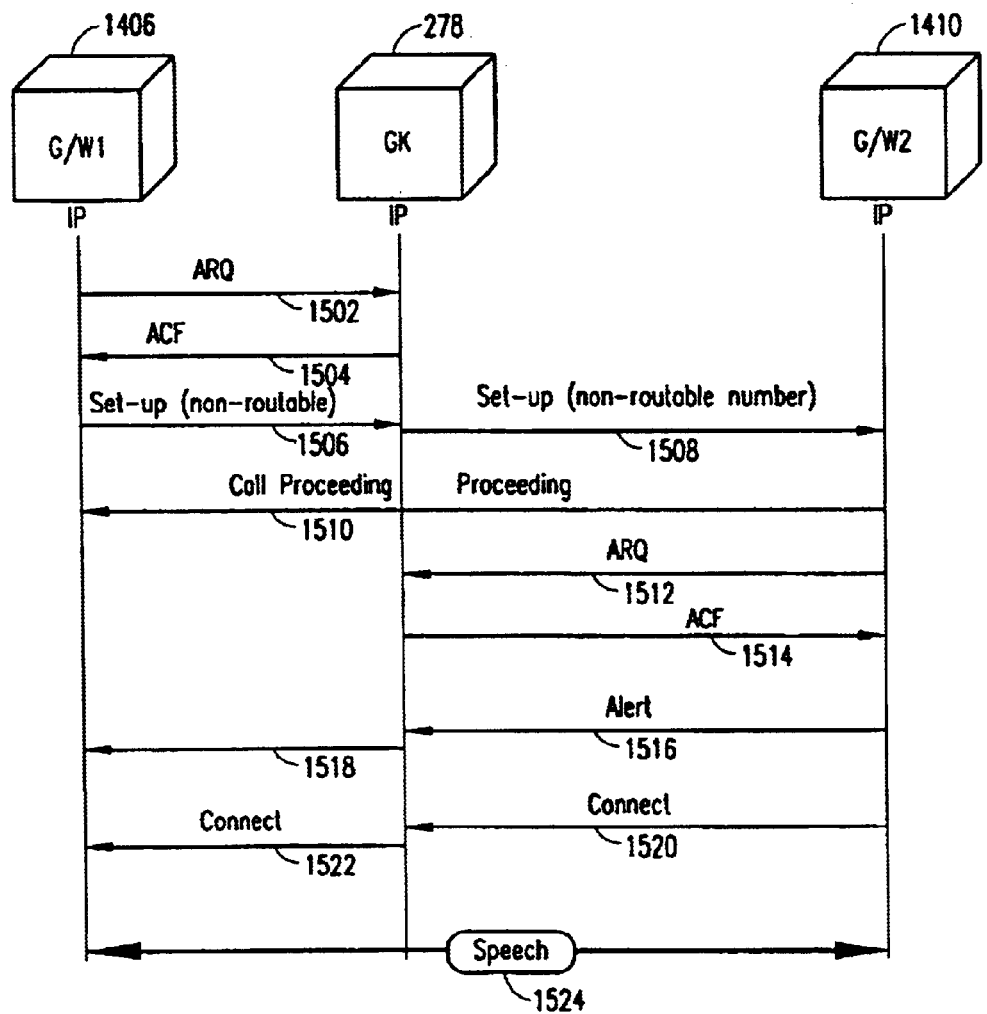

FIG. 11 depicts a control flow pathway for the IP-based routing methodology described above. For the sake of brevity, only the H.323 messaging among the IP nodes is shown. MSC1 1402 is assumed to be the GMSC, whereas MSC2 1404 operates as the VMSC. When the call is received in the GMSC associated with GW-1 1406, after acquiring the non-routable number from the VMSC as set forth in the foregoing, GW-1 engages in the RAS messaging with the gatekeeper 278 (paths 1502 and 1504) prior to issuing the Q.931 Call Setup message 1506 thereto. The Call Setup message, which includes the non-routable number, is propagated via path 1508, to GW-2 1410 of the VMSC. A Call Proceeding message 1510 is issued back from GW-2 to GW-1. Subsequently, GW-2 1410 engages in the RAS messaging with the gatekeeper 278 (paths 1512 and 1514) prior to issuing an Alert message which is propagated via the gatekeeper 278 to GW-1 (via paths 1516 and 1518). Thereafter a Connect message is issued from GW-2 to GW-1 (paths 1520 and 1522) to indicate that a voice/speech channel 1524 is available for routing the call to the called MS.

It should now be realized by one of ordinary skill in the art upon reference hereto that the present invention provides a convenient solution in the context of an integrated WLIP architecture, wherein the need for expensive roaming numbers is eliminated for voice calls delivered over IP. Accordingly, the system and method set forth herein advantageously provides considerable savings for the operators who are relieved from purchasing the roaming numbers from the PSTN owners.

VIII. Routing of Roaming Calls in the WLIP Network

In the description of the system and method for eliminating roaming numbers set forth above, it has been explained that the MSCs are provided with the gateways, and the gatekeeper is equipped with a database that is populated with operator-provided non-routable numbers and includes an IP address translation mechanism therefor. Clearly, the system and method presented therein affects all terminated mobile calls in the network because the solution therein involves the provision of non-routable numbers on the network-level and their IP addresses.

The present invention also provides yet another solution wherein the option of routing of a call over the IP network portion is provided as a new subscriber category in the HLR. In accordance with the teachings herein, when this category is turned on, the call leg from the GMSC to VMSC will be routed over the IP network portion. Appropriate technical background information is briefly recapitulated immediately below.

In the conventional POCS infrastructures, when a call to a mobile subscriber (MS) is received in the GMSC, LOCREQ and ROUTREQ messages are issued to the HLR and VMSC, respectively, so that the TLDN of the roaming MS is eventually returned to the GMSC. From the GMSC, the call is routed to the VMSC on the circuit-switched telephone network. If the MS is roaming away from the home area, the GMSC-to-VMSC call leg is a long distance call which can be between two neighboring Local Access and Transport Areas (LATAs), two LATAs geographically separated from each other, or across a continent. Clearly, routing roaming calls exclusively through the circuit-switched network defeats the rationale behind providing an integrated WLIP network system.

Accordingly, the present invention is directed to a solution with the object to route the long-distance roaming call leg from the GMSC-to-VMSC through an IP network portion, thereby bypassing the backbone circuit-switched telephone network. It should be apparent that such a solution advantageously provides considerable cost savings for the mobile subscribers.

Figure 12:
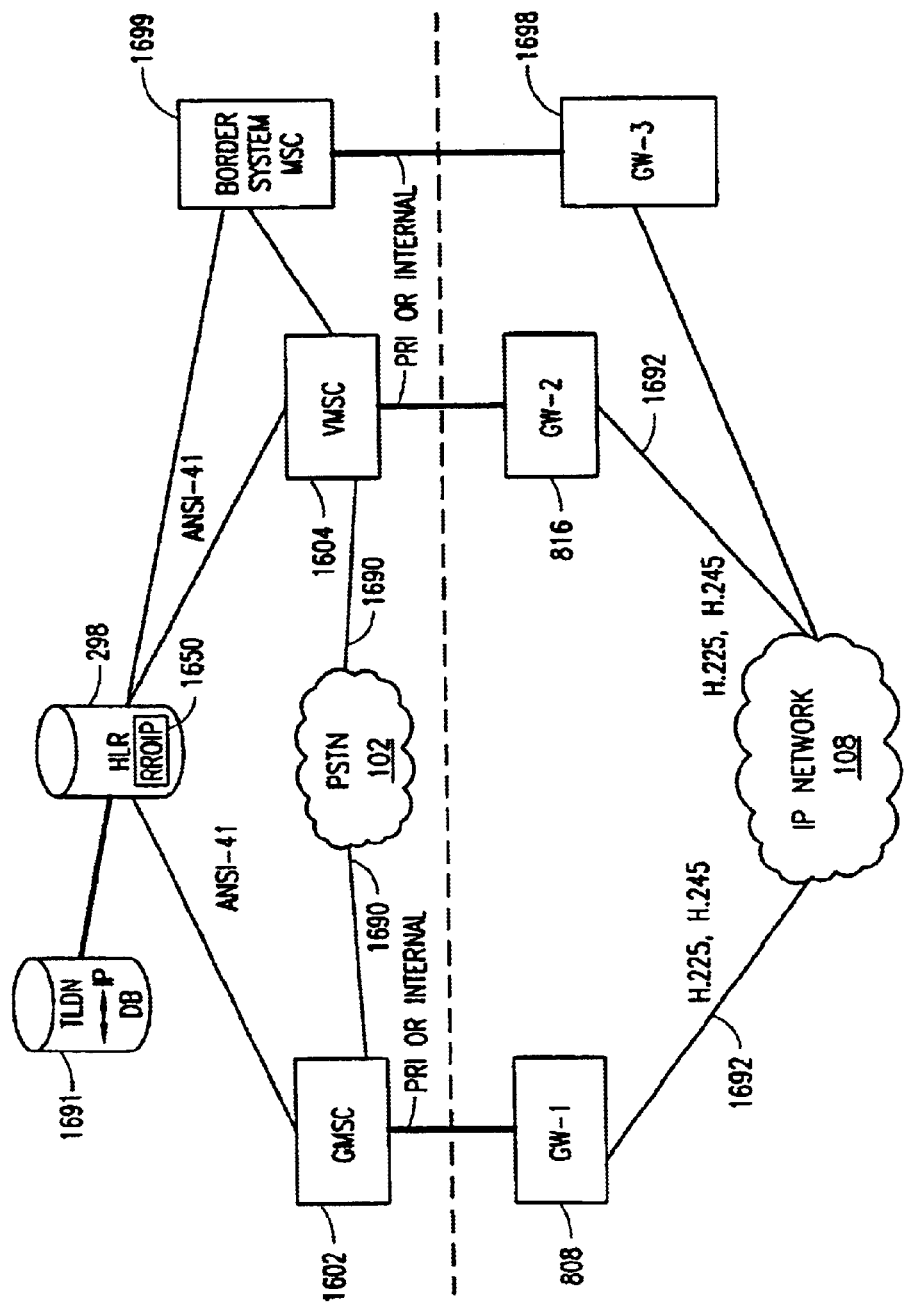
FIG. 12 depicts a functional block diagram of an integrated IP network system for routing roaming cellular calls over the VoIP network.

A presently preferred exemplary embodiment of the present solution involves the following network configuration, as depicted in the functional block diagram shown in FIG. 12, which may be realized from the integrated WLIP network system of the present invention:

(A) VMSC 1604 equipped with an H.323 gateway (GW-2) 816, either integrated or connected through PRI/ISUP. The IP address of GW-2 is known to the VMSC.

(B) Border System MSC (BSMSC) 1699 equipped with a GW-3 1698, either integrated or connected through PRI/ISUP. The IP address of GW-3 is known to the BSMSC.

(C) If, for some reason, the VMSCs and BSMSCs of the network system are not aware of, or do not include, the IP addresses of their respective GWs, as an alternative embodiment may be provided wherein a database containing the mapping from TLDN to GW's IP address is used. As will be seen below, this database can be either integrated within the HLR or provided as an external server, answering TLDN-IP Address queries from the HLR.

(D) GMSC 1602 equipped with a GW-1 808, also either integrated or connected through PRI/ISUP. The GW-1, GW-2, and GW-3 are provided as part of the IP network portion 108 of the integrated WLIP system. The IP network portion 108 may be provided as the Internet or an Intranet.

(E) A new subscriber category, called "Roaming Routing Over IP Network" (RROIP) 1650, is introduced in the HLR 298. As stated hereinabove, when this category is turned on, the call leg from the GMSC 1602 to the VMSC 1604 is routed over the IP network 108. Otherwise, it is routed over the backbone PSTN 102.

Figure 13A:
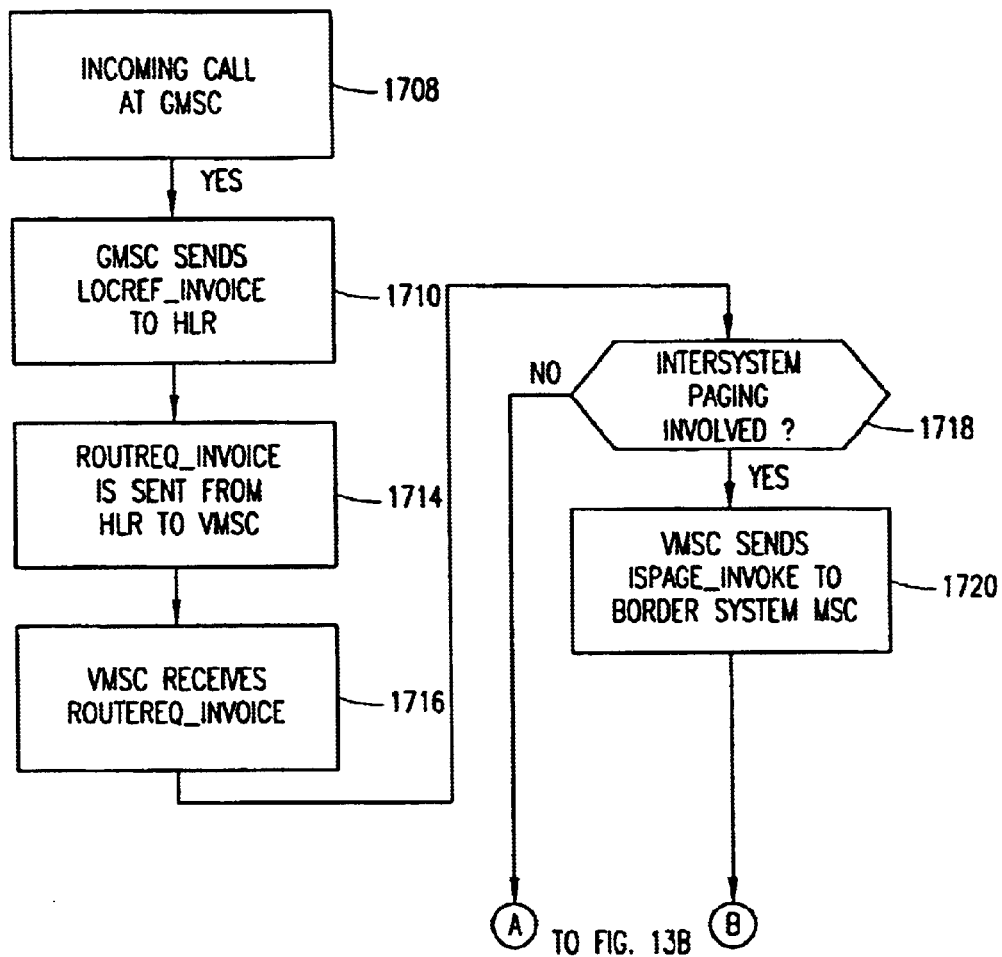
FIGS. 13A–13C illustrate a flow chart of an exemplary method for routing a roaming cellular over the VoIP network.
Figure 13B:
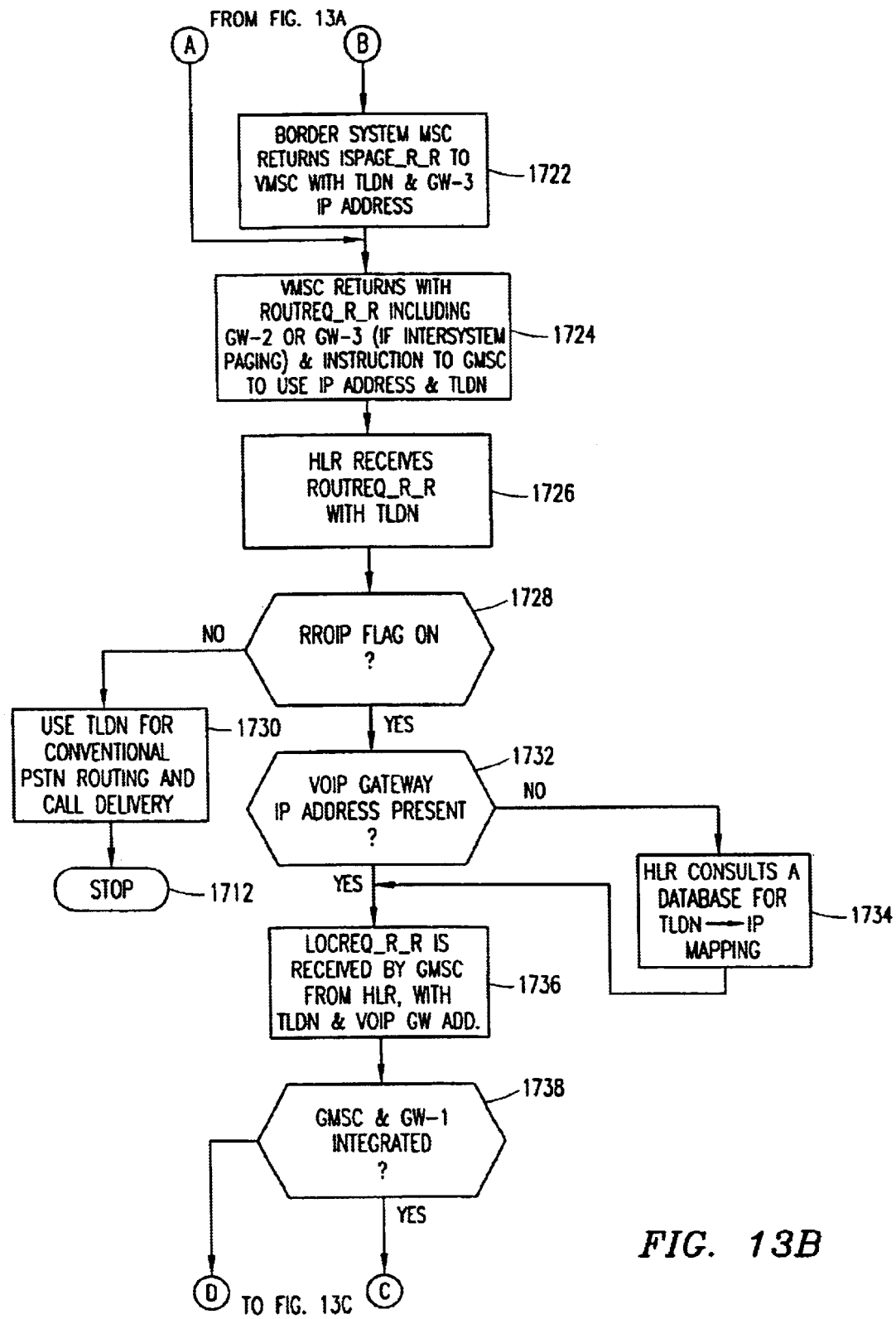
Figure 13C:
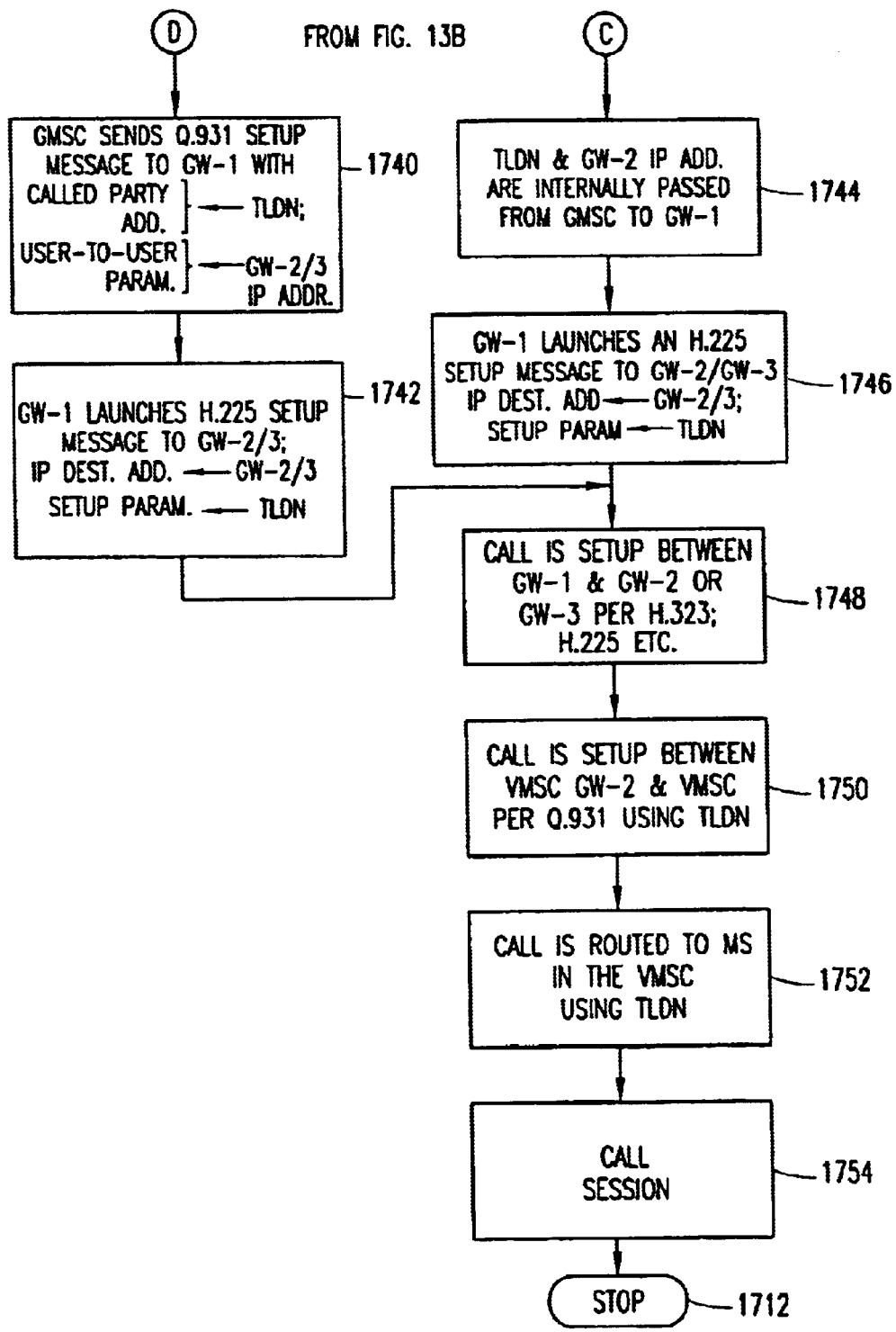

Referring now to FIGS. 13A–13C, depicted therein is a flow chart of an exemplary embodiment of the method of routing roaming calls over the IP network portion in accordance with the teachings herein. When an incoming call destined for the MS is received in the GMSC 1602, as provided in step 1708, the GMSC 1602 sends a LOCREQ_Invoke to the HLR 298 (step 1710). Responsive to the LOCREQ_Invoke, the HLR 298 issues a ROUTREQ_Invoke message to the VMSC 1604 (step 1714). Upon receiving the ROUTREQ_Invoke message in the VMSC 1604 (step 1716), a determination is made if Intersystem Paging is involved (decision block 1718). If so, the VMSC 1604 sends an ISPAGE_Invoke message to the BSMSC 1699 (step 1720). Thereafter, responsive thereto, the BSMSC 1699 returns the ISPAGE_Return_Result to the VMSC 1604 with a TLDN and the IP address of its gateway, that is, GW-3 1698 (step 1722). Subsequently, in step 1724, the VMSC returns with ROUTREQ_Return_Result, including the IP address of either GW-2 or GW-3 (only if the Intersystem Paging is involved), the TLDN, and an instruction for the GMSC 1602 to route the call over the IP network 108, as appropriate. It can be seen that the control from the decision block 1718 flows directly to the step 1724 if the Intersystem Paging is not involved.

Upon receiving the TLDN and appropriate gateway IP address (step 1726), the HLR 298 determines if the RROIP flag is turned on (decision block 1728). If not, the TLDN may used in a conventional manner to route the call over the PSTN 102 (step 1730). Thereafter, the process control flow stops (step 1712). On the other hand, if the RROIP flag is turned on, another determination is made (decision block 1732) to ensure that the appropriate media GW's IP address is present and available. As an alternative network embodiment, when the VMSCs and BSMSCs are not aware of, or include, the GW's IP address, or if the GW's IP address is not present or available for some reason, a database 1691 containing the mapping from the TLDN to GW's IP address may be used by the HLR. Accordingly, the HLR 298 may optionally consult the database 1691 which contains the mapping from the TLDN to the appropriate GW's IP address (step 1734). Moreover, if the Intersystem Paging is involved, the TLDN is mapped to the IP address corresponding to GW-3. Otherwise, the TLDN is mapped to the IP address of GW-2 (associated with the VMSC 1604).

Once the IP address of the appropriate GW is ascertained to be present or determined via the TLDN⇌IP address mapping, a LOCREQ_Return_Result is issued from the HLR 298 to the GMSC 1602 (step 1736). This return result contains the TLDN and media GW's IP address. Since the GMSC and its GW may be integrated or provided as separate units depending upon the implementational objectives, a decision block 1738 may be employed for appropriate flow control.

If the GMSC and its GW-1 are integrated, the TLDN and the media GW's IP address are passed internally from the GMSC to GW-1 (step 1744). Subsequently, GW-1 808 launches an H.225 Setup message directed at either GW-2 or GW-3. As shown in step 1746, the IP destination address for the Setup message is the IP address of either of the two gateways, GW-2 or GW-3. Also, the Setup message parameter called DestinationAddress is provided to be the TLDN. On the other hand, when the GMSC and its GW-1 are not integrated, they may be provided with a suitable interface, e.g., PRI, therebetween, such that appropriate Q.931 messaging is effectuated first. Once the Q.931 Setup is established between the GMSC and its GW-1, the H.225 session is initiated with the appropriate GW as described above. These processes are set forth in steps 1740 and 1742. In step 1740, the Q.931 Setup message between the GMSC and its GW-1 is shown more particularly. The Called Party Address parameter of the Q.931 Setup message is provided to be the TLDN, while the User-to-User parameter is populated with the IP address of either GW-2 or GW-3.

After launching the H.225 session (via step 1746 or step 1742), the rest of the call setup between GW-1 and the appropriate GW is effectuated in accordance with the H.323 protocol. Thereafter, the voice call path is set up between GW-1 and GW-2/GW-3 over the IP network per H.323, H.225, and H.245 procedures (step 1748). From the GW to its MSC, the call is set up with the TLDN, using the PRI as per ISDN Q.931 (step 1752). Once the call session (step 1754) is established by the IP routing provided in accordance herewith, the call is connected to the MS in the serving MSC in exactly the same way as it would have been, if routed over the PSTN.

Based on the foregoing, it should be readily appreciated that the system and method of routing roaming calls set forth above advantageously provides two exemplary embodiments of a subscription-based IP routing mechanism for roaming subscribers. The subscribers can accrue substantial savings because the long-distance leg of the routing is effectuated over the IP network which offers a more efficient bandwidth usage. It should further be appreciated that in the alternative embodiment set forth above which includes a separate database with the TLDN-IP Address mapping, no changes are needed in the ANSI-41 infrastructure of the PLMN.

IX. System and Method for Avoiding Roaming Number Usage

In the foregoing sub-sections, the conventional use of roaming numbers for the purpose routing calls has been explained. Also, some of the problems associated with such use have been described. In the previously described system and method for eliminating the roaming numbers in the WLIP network, the gatekeeper is equipped with a database that is populated with operator-provided non-routable numbers and an IP address translation mechanism therefor. However, it should be realized that ultimately it is desirable and highly advantageous for the IP-capable MSCs to not generate and/or use any number for the purpose of IP address translation, but rather, directly utilize the IP addressing for the purpose of routing calls. The present invention provides a solution wherein the originating MSC (a GMSC) transmits an indication that it is IP-capable, and the serving or visited MSC (VMSC) of the mobile subscriber issues its IP address in response thereto. In this manner, the VMSC is not burdened with the provision of non-routable numbers, and further, the gatekeeper of the network need not be provided with a separate IP address translation mechanism.

Figure 14:
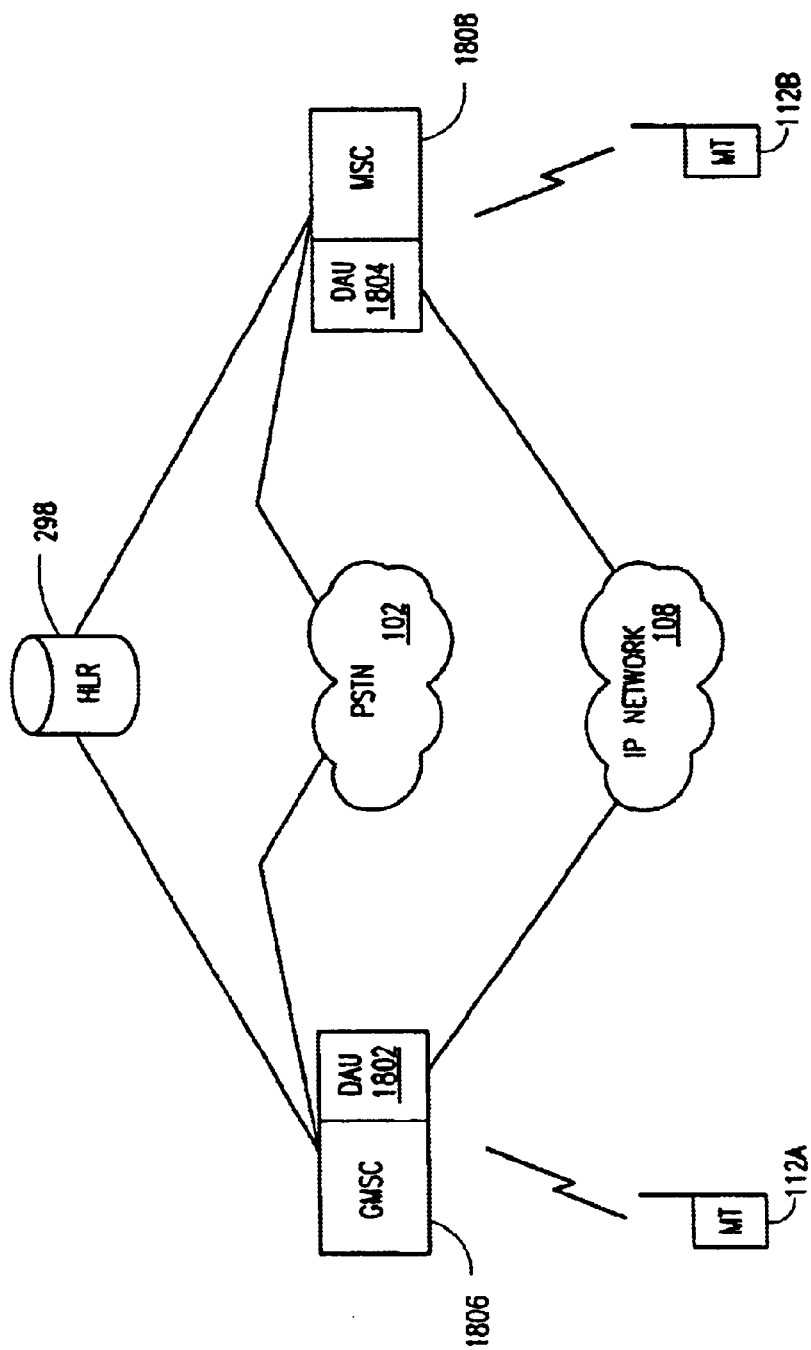
FIG. 14 depicts a functional block diagram of a system for avoiding the use of a roaming number by a serving Mobile Switching Center (MSC)

Referring now to FIG. 14, provided therein is an appropriate network portion of the integrated WLIP network system for realizing the teachings of the present invention in a presently preferred exemplary embodiment. The familiar elements are configured such that the GMSC 1806 is provided with an IP-capable interface (e.g., a Direct Access Unit (DAU) 1802) for directly interfacing with the IP network 108. Also, the serving or visited MSC (VMSC) 1808 is provided with its own direct IP-interface unit 1804. MT 112A and 112B are provided as the caller and callee, respectively.

Figure 15:
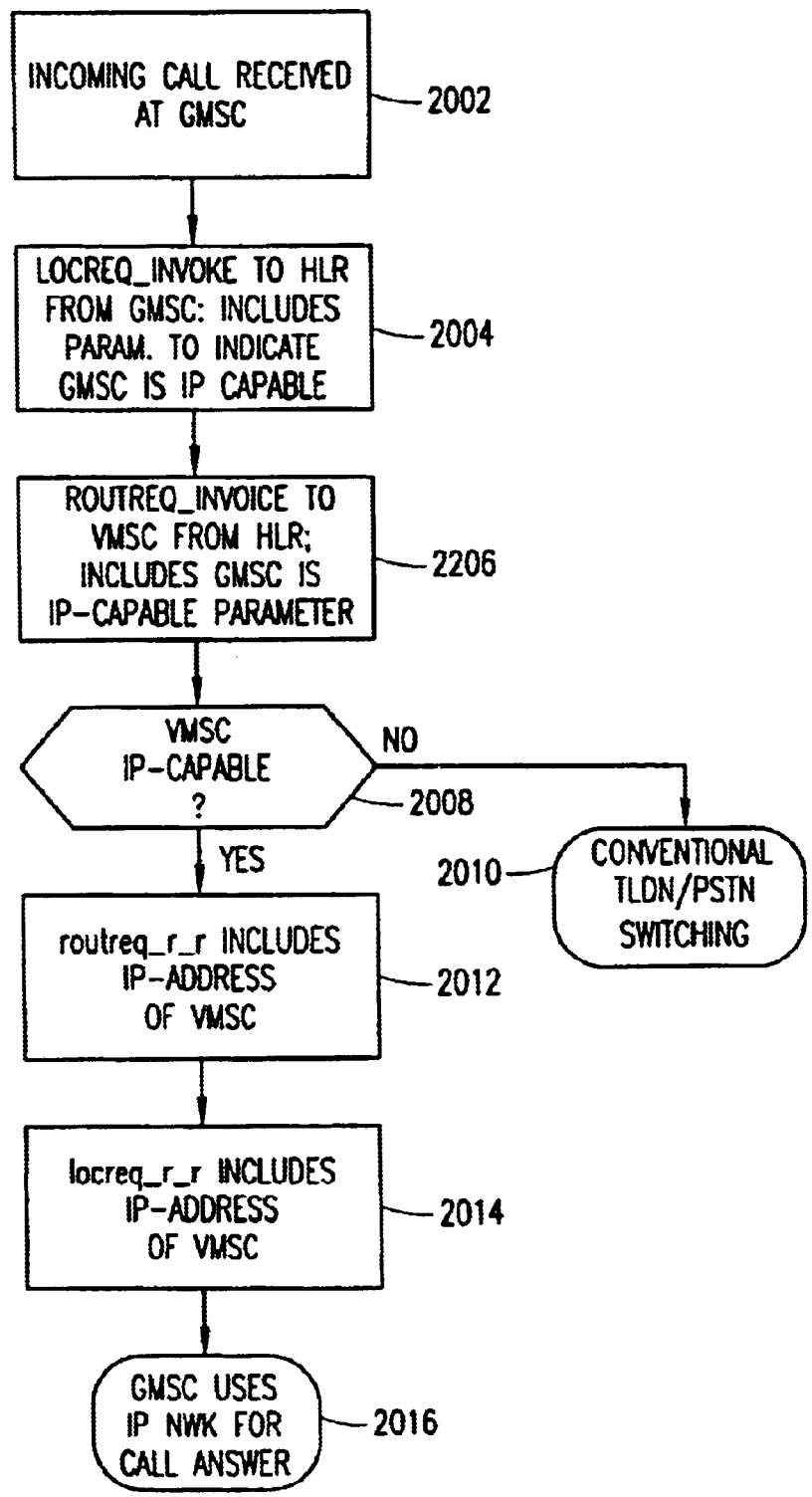
FIGS. 15 and 16 illustrate, respectively, a flow chart for avoiding the use of a roaming number by the serving MSC and a control message pathway therefor.
Figure 16:
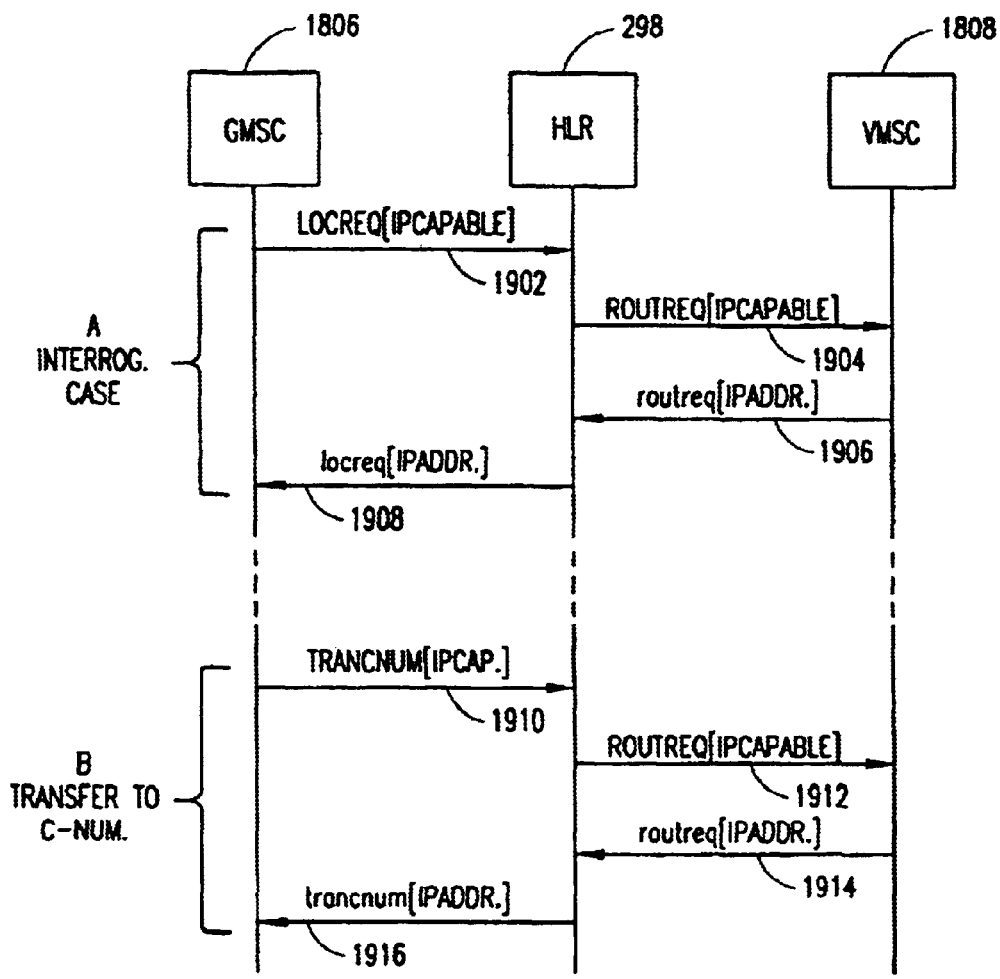

FIG. 15 depicts a flow chart for an exemplary embodiment of the call routing method without using any routable or non-routable numbers. FIG. 16 depicts a control message pathway therefor which illustrates the modifications to relevant ANSI-41 messages provided in accordance with the teachings of the present invention. The following description of the call routing method refers to these two FIGURES in particular, in addition to the elements shown in FIG. 18.

When an incoming call that is originated by MT 112A is received in the GMSC 1806 (step 2002), a LOCREQ_Invoke message 1902 is issued therefrom to the HLR 298 (step 2004). This message includes an indication that the GMSC 1806 is IP-capable by virtue of an IP-interface, e.g., the DAU 1802. Responsive thereto, the HLR 298 issues a ROUTREQ_Invoke message path 1904 to the VMSC 1808 (step 2006). This message includes the parametric indication that the GMSC is IP-capable.

Upon receiving the ROUTREQ_Invoke message 1904, a determination is made in the VMSC 1808 whether the VMSC is also IP-capable (decision block 2008). If not, the call may be optionally delivered to the called MT 112B, via the conventional PSTN routing with a TLDN (step 2010). Otherwise, when the VMSC 1808 is also determined to be IP-capable on account of a suitable interface, e.g., the DAU 1804, a routereq_return_result message 1906 is sent from the VMSC 1808 to the HLR 298 (step 2012). This return message includes the IP address of the VMSC 1808 as a parameter. Subsequently, the HLR298 issues a locreq_return_result message 1908 which includes the IP address parameter to the GMSC 1806 (step 2014). The GMSC 1806 then uses the IP address of the VMSC 1808 in order to route the call to MT 112B (step 2016).

Those of ordinary skill in the art should realize upon reference hereto that the call routing method set forth above is also applicable to situations wherein the incoming call is to be transferred to a Call forwarding number (C-number). Modified control messages for effectuating IP-based call transfer are depicted in portion B of FIG. 20. Essentially, the parametric indication that GMSC 1806 is IP-capable is included in a Transfer-to-C-Number (TRANCNUM) message 1910 sent from the GMSC to the HLR 298. An IP-address, as appropriate, is retrieved from the VMSC 1808 at 1912 and 1914. The IP address then is returned to the GMSC in a trancnum response message 1916.

Based on the foregoing, it should be appreciated that the solution set forth above advantageously provides a call routing method that substantially maximizes the potential benefits of integrating the IP-based infrastructures with the POCS infrastructures, especially for the purpose of call routing. In one embodiment, a decided advantage provided herein is the complete elimination of the circuit-switching infrastructure for call routing. Clearly, considerable cost savings may be realized by the operators by deploying such a scheme.

Although the systems and methods of the various aspects of the present invention have been described in particular reference to the H.323 protocol and ANSI-41 standards, it should be realized upon reference hereto that the innovative teachings contained herein are not necessarily limited thereto and may be implemented advantageously with any applicable packet-switching protocols and radio telecommunications standards.

Further, it is believed that the operation and construction of the various aspects of the present invention will be apparent from the foregoing description. While the methods and systems shown and described have been characterized as being preferred, it will be readily apparent that various changes and modifications could be made therein without departing from the scope of the present invention as set forth in the following claims.

What is claimed is:

1. An integrated wireless telecommunications network, comprising:

a cellular network portion providing mobile telecommunications functionality to mobile subscribers;

a packet-switched network (PSN) portion for transporting communication traffic, wherein the communication traffic comprises traffic originated from a mobile subscriber and traffic intended for the mobile subscriber;

a gateway disposed between the cellular network portion and the packet-switched network portion, the gateway providing a communication path therebetween; and an interworking interface module provided between the cellular network portion and the packet-switched network portion, the interworking interface module comprising a mobility gateway and an Internet Protocol (IP) client, wherein the mobility gateway handles mobility management information and the translation of control signaling information between the cellular network portion and the packet-switched network portion, and the IP client handles communication traffic with associated servers in the PSN portion.

2. The integrated wireless telecommunications network as set forth in claim 1, further comprising a Public Switched Telephone Network (PSTN) portion operably coupled to at least one of the cellular network portion, the PSN portion, and the gateway.

3. The integrated wireless telecommunications network as set forth in claim 1, wherein the mobility gateway of the interworking interface module comprises an entity external to the cellular network portion.

4. The integrated wireless telecommunications network as set forth in claim 1, wherein the IP client of the interworking interface module comprises a proxy co-located within the cellular network portion.

5. The integrated wireless telecommunications network as set forth in claim 1, wherein the mobility gateway of the interworking interface module is implemented within a Visitor Location Register (VLR) disposed in the cellular network portion.

6. The integrated wireless telecommunications network as set forth in claim 5, wherein the cellular network portion includes a mobility client that interfaces with a radio access function associated with the cellular network portion, and further wherein the PSN portion comprises a location server for providing location updates to the VLR, the mobility client operating to provide update location information to the location server.

7. The integrated wireless telecommunications network as set forth in claim 1, further including means for transferring call states associated with the interworking interface module to a target serving system within the cellular network portion during an inter-system handoff.

8. The integrated wireless telecommunications network as set forth in claim 1, wherein the PSN portion includes call server means for handling call control functions relating to the communication traffic, and further wherein the cellular network portion includes call and service means for managing call and service processing specific to the mobile subscriber.

9. The integrated wireless telecommunications network as set forth in claim 8, wherein the call server means in the packet-switched network portion is provided as a slave to the call and service means in the cellular network portion for managing call and service processing specific to the mobile subscriber.

10. The integrated wireless telecommunications network as set forth in claim 9, wherein the call server means in the packet-switched network portion implements a request/reply interface directed to the call and service means for managing call and service processing specific to the mobile subscriber in the cellular network portion.

11. The integrated wireless telecommunications network as set forth in claim 10, wherein the cellular network portion includes a call client interfaced between the call server means in the packet-switched network portion and the call and service processing means in the cellular network portion.

12. The integrated wireless telecommunications network as set forth in claim 8, wherein the call server means in the packet-switched network includes means for maintaining service trigger detection points for the mobile subscriber.

13. The integrated wireless telecommunications network as set forth in claim 8, wherein the call and service means in the cellular network portion maintains service trigger detection points for the mobile subscriber.

14. A method of routing a calling party's call to a mobile terminal in an integrated wireless packet-switched network which includes a cellular network portion and a packet-switched network portion, the cellular network portion comprising a Visitor Location Register (VLR) having an interface operable with the packet-switched network portion and a Mobile Switching Center (MSC) serving the mobile terminal, and the packet-switched network portion coupled to a gatekeeper and a gateway, wherein the gateway is located closest to the MSC, the method comprising the steps of:

receiving the call in the packet-switched network portion, wherein the call is intended for the mobile terminal served by the MSC;

responsive to the call, sending a request message from the packet-switched network portion to the gatekeeper for locating the mobile terminal;

responsive to the request message, sending a location request from the gatekeeper to the VLR interface for determining the address of the gateway that is located closest to the MSC;

sending a location confirm return message from the VLR interface to the gatekeeper, the location confirm return message including the gateway's address, if available; and routing the call from the packet-switched network portion to the gateway based on the received address from the gatekeeper.

15. The call routing method as set forth in claim 14, wherein the request message contains the mobile terminal's number as a parameter.

16. The call routing method as set forth in claim 14, further comprising the steps of determining, in the VLR, whether the mobile terminal is registered thereat, and if not, sending a location reject return message from the VLR to the gatekeeper.

* * * * *